United States Patent
Rambo et al.

(10) Patent No.: US 11,692,479 B2
(45) Date of Patent: Jul. 4, 2023

(54) HEAT EXCHANGER WITH ACTIVE BUFFER LAYER

(71) Applicant: General Electric Company, Schenectady, NY (US)

(72) Inventors: Jeffrey Douglas Rambo, Mason, OH (US); Thomas Kupiszewski, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 465 days.

(21) Appl. No.: 16/592,122

(22) Filed: Oct. 3, 2019

(65) Prior Publication Data
US 2021/0102492 A1  Apr. 8, 2021

(51) Int. Cl.
| | | |
|---|---|---|
| *F02C 6/08* | (2006.01) | |
| *B64C 30/00* | (2006.01) | |
| *B64D 33/00* | (2006.01) | |
| *B64D 37/02* | (2006.01) | |
| *F17C 7/04* | (2006.01) | |
| *F28F 9/02* | (2006.01) | |

(52) U.S. Cl.
CPC ........... *F02C 6/08* (2013.01); *B64C 30/00* (2013.01); *B64D 33/00* (2013.01); *B64D 37/02* (2013.01); *F17C 7/04* (2013.01); *F28F 2009/0287* (2013.01)

(58) Field of Classification Search
CPC ........... B64D 37/02; B64D 37/08; F02C 6/08
See application file for complete search history.

(56) References Cited

U.S. PATENT DOCUMENTS

| | | | |
|---|---|---|---|
| 3,522,008 A | | 7/1970 | Defabaugh et al. |
| 4,138,856 A | | 2/1979 | Orlowski |
| 4,199,975 A | | 4/1980 | Schrock et al. |
| 4,466,481 A | | 8/1984 | Wilson et al. |
| 4,759,401 A | * | 7/1988 | Pfouts ............... F28F 27/00 165/51 |
| 5,048,597 A | | 9/1991 | Bond |
| 5,149,018 A | * | 9/1992 | Clark ............... B64C 1/38 165/908 |
| 5,272,870 A | | 12/1993 | Grieb et al. |
| 5,313,790 A | | 5/1994 | Barr |
| 5,337,553 A | | 8/1994 | Barr |
| 5,649,589 A | | 7/1997 | Carpentier |

(Continued)

FOREIGN PATENT DOCUMENTS

| | | |
|---|---|---|
| FR | 1418999 A | 11/1965 |
| FR | 2956732 A1 | 8/2011 |

*Primary Examiner* — Michael H Wang
(74) *Attorney, Agent, or Firm* — Dority & Manning, P.A.

(57) ABSTRACT

Heat exchangers, heat exchanger systems, and hypersonic vehicles are provided. For example, a heat exchanger is provided that comprises a first chamber for receipt of a flow of cool fluid and a second chamber for receipt of a flow of hot fluid. The heat exchanger further comprises a buffer fluid flowpath for circulation of a buffer fluid therethrough. The buffer fluid circulates within the buffer fluid flowpath disposed between the first chamber and the second chamber to transfer heat from the hot fluid to the cool fluid. In certain embodiments, a hypersonic vehicle comprises such a heat exchanger, and the cool fluid is cryogenic or near-cryogenic fuel of the hypersonic vehicle and the hot fluid is engine bleed air from a hypersonic propulsion engine of the vehicle.

20 Claims, 11 Drawing Sheets

(56) References Cited

U.S. PATENT DOCUMENTS

| | | |
|---|---|---|
| 5,834,632 A | 11/1998 | Olender et al. |
| 5,893,411 A * | 4/1999 | Nir .................... F22B 3/04 |
| | | 165/140 |
| 6,715,293 B2 | 4/2004 | Sillence et al. |
| 7,267,161 B2 | 9/2007 | Colasson et al. |
| 7,871,578 B2 | 1/2011 | Schmidt |
| 7,886,580 B2 | 2/2011 | Kumar et al. |
| 7,900,438 B2 | 3/2011 | Venkataramani et al. |
| 7,938,171 B2 | 5/2011 | Norris et al. |
| 8,127,555 B2 | 3/2012 | Jarmon et al. |
| 8,261,593 B1 | 9/2012 | Sanders |
| 8,291,748 B2 | 10/2012 | Kumar et al. |
| 8,591,102 B2 | 11/2013 | Frach et al. |
| 8,656,722 B2 | 2/2014 | Norris et al. |
| 8,733,427 B2 | 5/2014 | So et al. |
| 8,776,866 B2 | 7/2014 | Cederberg et al. |
| 8,943,827 B2 | 2/2015 | Prociw et al. |
| 9,004,154 B2 * | 4/2015 | Hagshenas ............... F01M 5/00 |
| | | 165/279 |
| 9,109,842 B2 | 8/2015 | Prociw et al. |
| 9,328,978 B2 | 5/2016 | Appukuttan et al. |
| 9,474,186 B2 | 10/2016 | Campbell et al. |
| 9,719,733 B2 * | 8/2017 | Yang .................... F28F 1/003 |
| 9,739,546 B2 | 8/2017 | Bertilsson et al. |
| 9,771,867 B2 | 9/2017 | Karam et al. |
| 9,810,153 B2 | 11/2017 | Bond et al. |
| 9,829,259 B2 | 11/2017 | Nyander et al. |
| 9,932,940 B2 | 4/2018 | Lo |
| 10,012,177 B2 | 7/2018 | Bond et al. |
| 10,119,769 B2 | 11/2018 | Yang |
| 2003/0070794 A1 * | 4/2003 | Ohira .................... F28D 7/0066 |
| | | 165/157 |
| 2003/0102113 A1 | 6/2003 | Memory et al. |
| 2005/0133195 A1 * | 6/2005 | Weng .................... F28D 15/00 |
| | | 165/53 |
| 2005/0274500 A1 * | 12/2005 | Baudat .................... F28D 7/106 |
| | | 165/140 |
| 2008/0142189 A1 | 6/2008 | Norris et al. |
| 2010/0212857 A1 * | 8/2010 | Bulin .................... F02C 7/14 |
| | | 165/41 |
| 2011/0302928 A1 | 12/2011 | Mudawar |
| 2012/0111095 A1 | 5/2012 | Sheehan |
| 2013/0186100 A1 | 7/2013 | Rhoden et al. |
| 2014/0251585 A1 | 9/2014 | Kusuda et al. |
| 2015/0101334 A1 | 4/2015 | Bond et al. |
| 2015/0323186 A1 | 11/2015 | Xu |
| 2016/0280387 A1 * | 9/2016 | Snape .................... F02C 7/14 |
| 2018/0347468 A1 * | 12/2018 | Caimano .................... F28F 13/12 |

\* cited by examiner

HEAT EXCHANGER WITH ACTIVE BUFFER LAYER

FIELD

The present subject matter relates generally to heat exchangers, more particularly, to heat exchangers having an active buffer layer and, most particularly, to heat exchangers having an active buffer layer for use with hypersonic propulsion engines.

BACKGROUND

High-speed hypersonic propulsion engines may facilitate supersonic and hypersonic air transport. Operating at such high speeds creates many issues not present, or less prevalent, in subsonic and supersonic flight operations. For example, thermal management becomes much more of an issue at high speed operations due to the increased amount of heat generated from hypersonic shock waves at hypersonic flight speeds. Accordingly, improvements to vehicles such as aircraft, hypersonic propulsion engines for vehicles, and thermal management systems, such as heat exchangers, that help overcome these issues would be useful.

BRIEF DESCRIPTION

Aspects and advantages of the invention will be set forth in part in the following description, or may be obvious from the description, or may be learned through practice of the invention.

In one exemplary embodiment of the present subject matter a heat exchanger is provided. The heat exchanger comprises a first chamber for receipt of a flow of cool fluid and a second chamber for receipt of a flow of hot fluid. The first chamber defines a first inlet for an ingress of the cool fluid into the first chamber and a first outlet for an egress of the cool fluid from the first chamber. The second chamber defines a second inlet for an ingress of the hot fluid into the second chamber and a second outlet for an egress of the hot fluid from the second chamber. The heat exchanger further comprises a buffer fluid flowpath for circulation of a buffer fluid therethrough. The buffer fluid flowpath comprises a buffer fluid inlet for an ingress of the buffer fluid and a buffer fluid outlet for an egress of the buffer fluid. The buffer fluid flowpath is disposed between the first chamber and the second chamber. The buffer fluid circulates within the buffer fluid flowpath disposed between the first chamber and the second chamber to transfer heat from the hot fluid to the cool fluid.

In another exemplary embodiment of the present subject matter, a heat exchanger system for a hypersonic propulsion engine is provided. The heat exchanger system comprises a first chamber for receipt of a flow of fuel and a second chamber for receipt of a flow of air. The first chamber defines a first inlet for an ingress of the fuel into the first chamber and a first outlet for an egress of the fuel from the first chamber. The second chamber defines a second inlet for an ingress of the bleed air into the second chamber and a second outlet for an egress of the bleed air from the second chamber. The heat exchanger system also comprises a buffer fluid flowpath for circulation of a buffer fluid therethrough. The buffer fluid flowpath comprises a buffer fluid inlet for an ingress of the buffer fluid and a buffer fluid outlet for an egress of the buffer fluid. A first wall separates the first chamber from the buffer fluid flowpath and a second wall separates the second chamber from the buffer fluid flowpath. The first wall is adjacent the second wall, and the first wall and the second wall define at least a portion of the buffer fluid flowpath that extends between the first chamber and the second chamber such that the flow of fuel is separated from the flow of air by the flow of buffer fluid.

In still another exemplary embodiment of the present subject matter, a hypersonic vehicle is provided. The hypersonic vehicle comprises a hypersonic propulsion engine comprising a combustion section and a ducting assembly comprising an outer case. The hypersonic vehicle further comprises a fuel delivery system for providing a flow of fuel to the combustion section of the hypersonic propulsion engine, and the fuel delivery system comprises a fuel tank. The hypersonic vehicle also comprises a heat exchanger disposed outside the outer case and in flow communication with the fuel tank and bleed air from the hypersonic propulsion engine. The heat exchanger comprises a first chamber for receipt of the flow of fuel and a second chamber for receipt of a flow of the bleed air. The first chamber defines a first inlet for an ingress of the fuel into the first chamber and a first outlet for an egress of the fuel from the first chamber. The second chamber defines a second inlet for an ingress of the bleed air into the second chamber and a second outlet for an egress of the bleed air from the second chamber. The heat exchanger also comprises a buffer fluid flowpath for circulation of a buffer fluid therethrough. The buffer fluid flowpath comprises a buffer fluid inlet for an ingress of the buffer fluid and a buffer fluid outlet for an egress of the buffer fluid. The buffer fluid flowpath is disposed between the first chamber and the second chamber. The buffer fluid circulates within the buffer fluid flowpath disposed between the first chamber and the second chamber to transfer heat from the bleed air to the fuel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
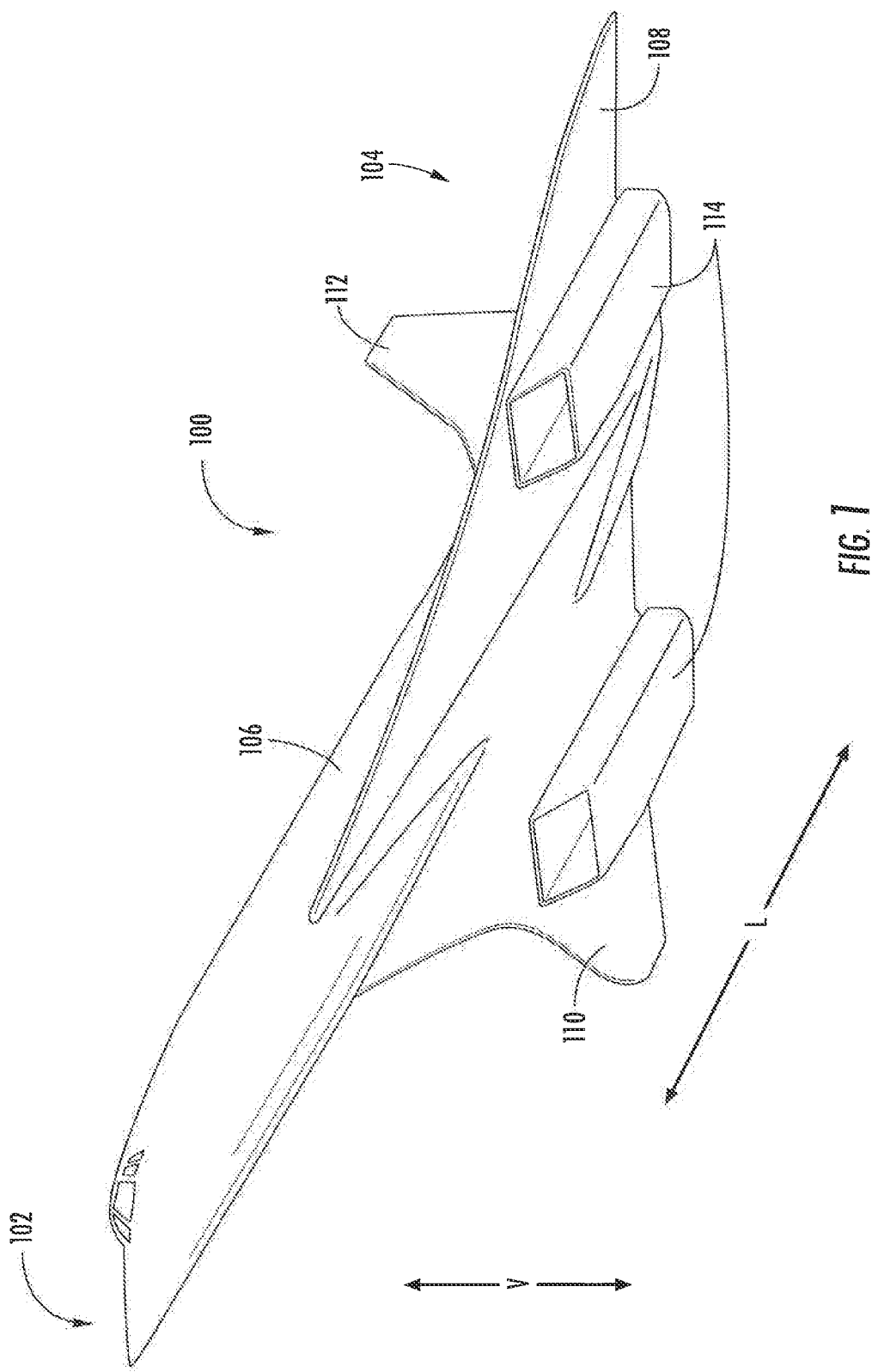
FIG. 1 is a perspective view of a hypersonic vehicle in accordance with an exemplary embodiment of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 provides a perspective view of a hypersonic vehicle 100 in accordance with an exemplary aspect of the present disclosure. The exemplary hypersonic vehicle 100 of FIG. 1 is a hypersonic aircraft that generally defines a vertical direction V, a lateral direction (not labeled), and a longitudinal direction L. Moreover, the hypersonic vehicle 100 extends between a forward end 102 and aft end 104 generally along the longitudinal direction L. For the embodiment shown, the hypersonic vehicle 100 includes a fuselage 106, a first wing 108 extending from a port side of the fuselage 106, and second wing 110 extending from a starboard side of the fuselage 106, and a vertical stabilizer 112. The hypersonic vehicle 100 includes a propulsion system, which for the embodiment shown includes a pair of hypersonic propulsion engines 114, with a first of such engines 114 mounted beneath the first wing 108 and a second of such engines 114 mounted beneath the second wing 110. As will be appreciated, the propulsion system may be configured for propelling the hypersonic vehicle 100 from takeoff (e.g., 0 miles per hour up to around 250 miles per hour) up and to hypersonic flight. It will be appreciated, that as used herein, the term "hypersonic" refers generally to air speeds of about Mach 3 up to about Mach 10, such as Mach 5 and up.

Notably, the exemplary hypersonic vehicle 100 depicted in FIG. 1 is provided by way of example only, and in other embodiments may have any other suitable configuration. For example, in other embodiments, the fuselage 106 may have any other suitable shape (such as a more pointed, aerodynamic shape, different stabilizer shapes and orientation, etc.), the propulsion system may have any other suitable engine arrangement (e.g., an engine incorporated into the vertical stabilizer), and/or any other suitable configuration.

Figure 2:
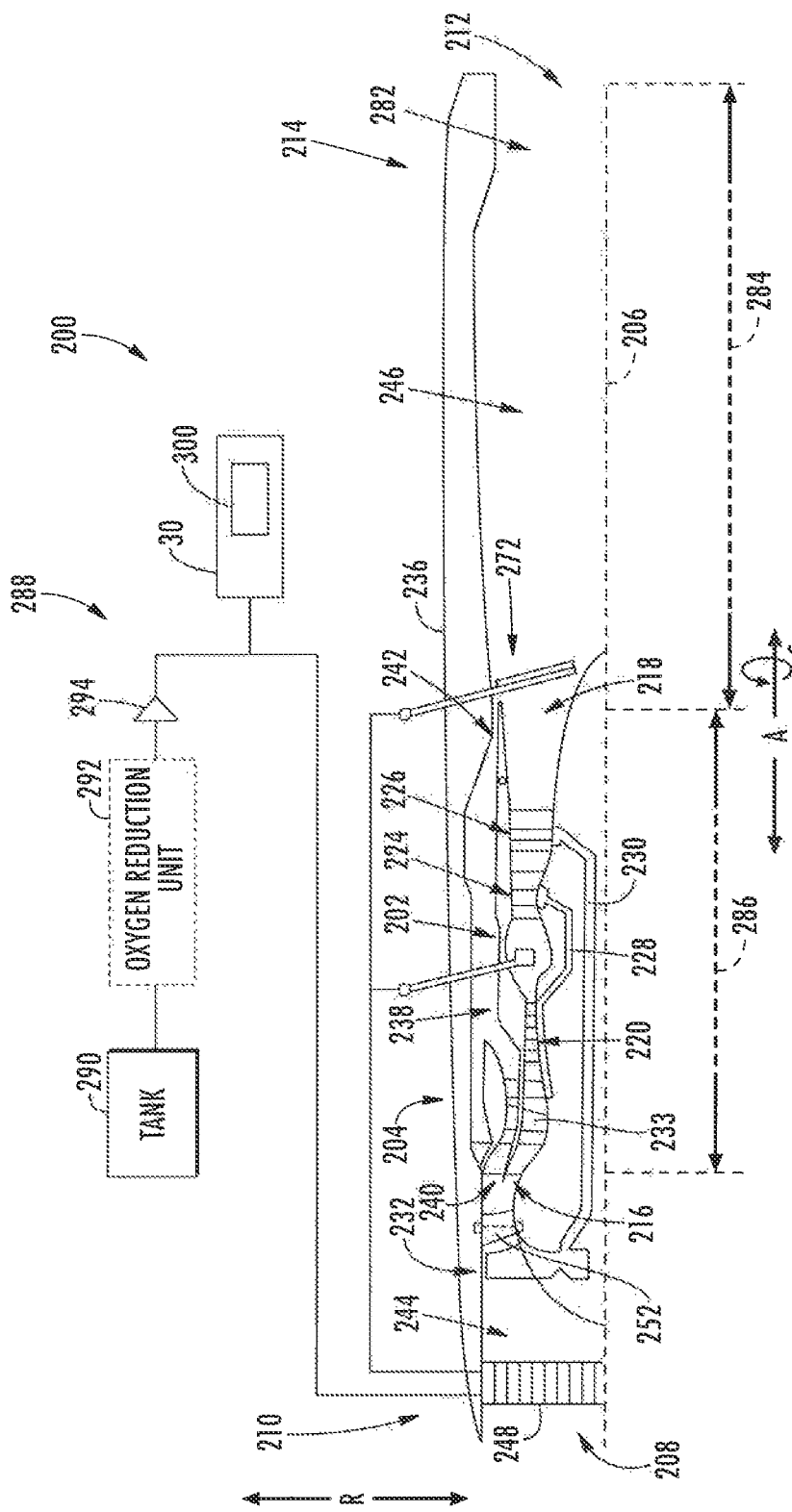
FIG. 2 is a cross-sectional, schematic view of a hypersonic propulsion engine in accordance with an exemplary embodiment of the present subject matter.
Figure 3:
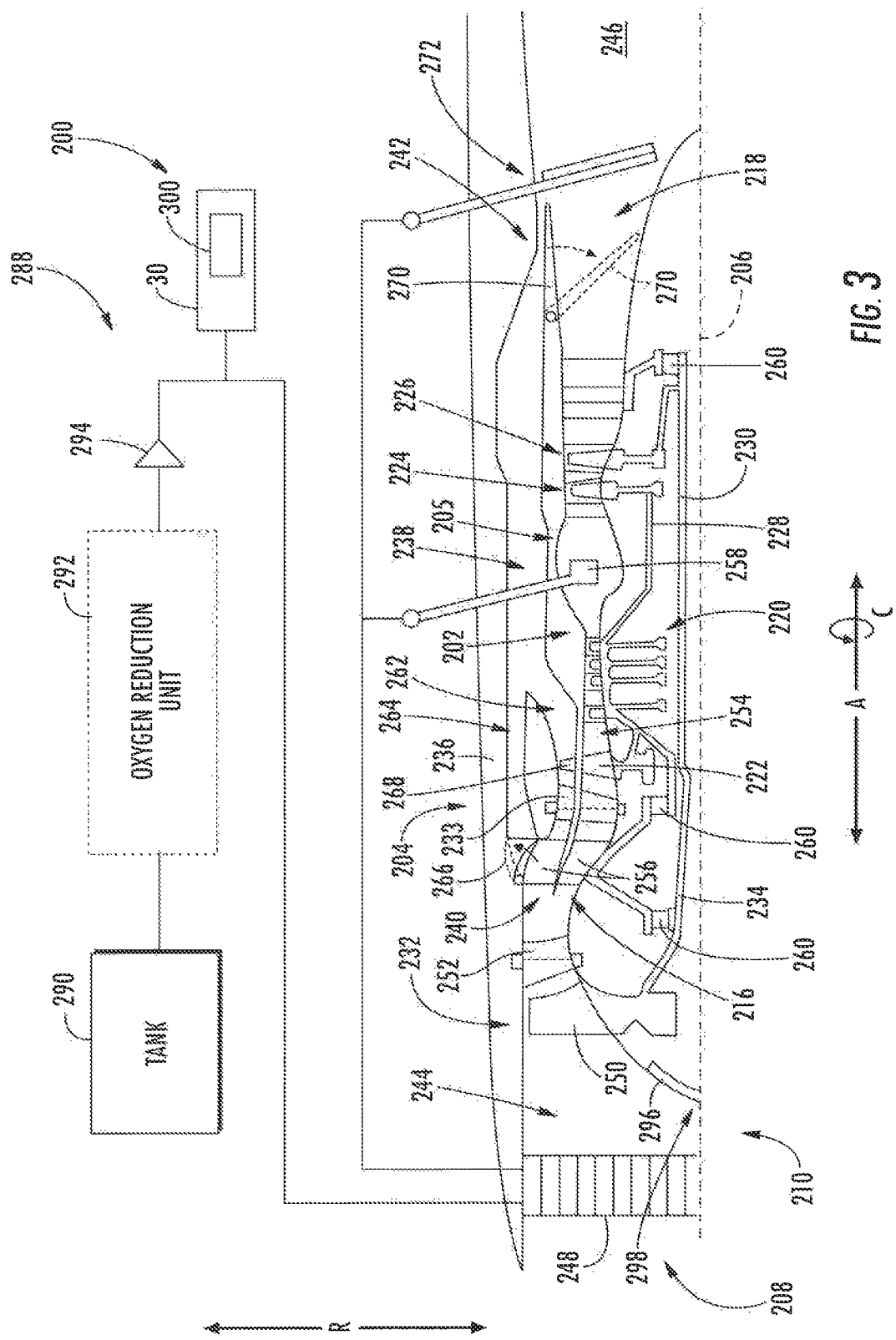
FIG. 3 is a close-up, cross-sectional, schematic view of the exemplary hypersonic propulsion engine of FIG. 2.

Referring now to FIGS. 2 and 3, cross-sectional views of a hypersonic propulsion engine 200 in accordance with an exemplary aspect of the present disclosure are provided. As will be appreciated, the depicted exemplary hypersonic propulsion engine 200 generally includes a turbine engine 202 and a ducting assembly 204. FIG. 2 provides a cross-sectional view of an entire length of the turbine engine 202 (showing all of the ducting assembly 204), and FIG. 3 provides a close-up view of a portion of the ducting assembly 204 and the turbine engine 202. Notably, the hypersonic propulsion engine 200 may be incorporated into a hypersonic vehicle (such as the hypersonic vehicle or aircraft 100 of FIG. 1 as engine 114).

The depicted exemplary hypersonic propulsion engine 200 generally defines an axial direction A (with a longitudinal centerline 206 extending along the axial direction A), a radial direction R, and a circumferential direction C (extending about the axial longitudinal centerline 206). Additionally, the hypersonic propulsion engine 200 defines an engine inlet 208 at a forward end 210 along the axial direction A and an engine exhaust 212 at an aft end 214 along the axial direction A.

Referring first particularly to the exemplary turbine engine 202, it will be appreciated that the depicted exemplary turbine engine 202 defines a turbine engine inlet 216 and a turbine engine exhaust 218. Further, the exemplary turbine engine 202 includes a compressor section, a combustion section 205, and a turbine section arranged in serial flow order. The compressor section includes a first compressor 220 having a plurality of sequential stages of compressor rotor blades (including a forward-most stage of compressor rotor blades 222). Similarly, the turbine section includes a first turbine 224 and further includes a second turbine 226. The first turbine 224 is a high speed turbine coupled to the first compressor 220 through a first engine shaft 228. In such a manner, the first turbine 224 may drive the first compressor 220 of the compressor section. The second turbine 226 is a low speed turbine coupled to a second engine shaft 230.

As will also be appreciated, for the embodiment shown, the hypersonic propulsion engine 200 further includes a fan 232. The fan 232 is located forward (and upstream) of the turbine engine inlet 216. Moreover, the fan 232 includes a fan shaft 234, which for the embodiment shown is coupled to or formed integrally with the second engine shaft 230, such that the second turbine 226 of the turbine section of the turbine engine 202 may drive the fan 232 during operation of the hypersonic propulsion engine 200. The engine 200 further includes a plurality of outlet guide vanes 233, which for the embodiment depicted are variable outlet guide vanes, configured to pivot about a rotational pitch axis (shown in phantom). The variable outlet guide vanes 233 may further act as struts. Regardless, the variable outlet guide vanes 233 may enable the fan 232 to run at variable speeds and still come out with relatively straight air flow. In other embodiments, the outlet guide vanes 233 may instead be fixed-pitch guide vanes.

Referring still to FIGS. 2 and 3, the ducting assembly 204 generally comprises an outer case 236 and defines a bypass duct 238, the outer case 236 and bypass duct 238 extending around the turbine engine 202. The bypass duct 238 may have a substantially annular shape extending around the turbine engine 202, such as substantially 360 degrees around the turbine engine 202. Moreover, for the embodiment shown, the bypass duct 238 extends between a bypass duct inlet 240 and a bypass duct exhaust 242. For the embodiment shown, the bypass duct inlet 240 is aligned with the turbine engine inlet 216 and the bypass duct exhaust 242 is aligned with the turbine engine exhaust 218.

Moreover, for the illustrated embodiment, the ducting assembly 204 further defines an inlet section 244 located at least partially forward of the bypass duct 238 and an afterburning chamber 246 located downstream of the bypass duct 238 and at least partially aft of the turbine engine exhaust 218. Referring particularly to the inlet section 244, for the embodiment shown, the inlet section 244 is located forward of the bypass duct inlet 240 and the turbine engine inlet 216. Moreover, for the depicted embodiment, the inlet section 244 extends from the hypersonic propulsion engine inlet 208 to the turbine engine inlet 216 and bypass duct inlet 240. By contrast, the afterburning chamber 246 extends from the bypass duct exhaust 242 and turbine engine exhaust 218 to the hypersonic propulsion engine exhaust 212 (FIG. 2).

Referring still to FIGS. 2 and 3, the illustrated hypersonic propulsion engine 200 further includes an inlet precooler 248 positioned at least partially within the inlet section 244 of the ducting assembly 204 and upstream of the turbine engine inlet 216, the bypass duct 238, or both (and, more particularly, upstream of both the turbine engine inlet 216 and the bypass duct 238 for the embodiment shown). As will be discussed in greater detail below, the inlet precooler 248 is generally provided for cooling an airflow through the inlet section 244 of the ducting assembly 204 to the turbine engine inlet 216, the bypass duct 238, or both.

During operation of the hypersonic propulsion engine 200, an inlet airflow is received through the hypersonic propulsion engine inlet 208. The inlet airflow passes through the inlet precooler 248, reducing a temperature of the inlet airflow. The inlet airflow then flows into the fan 232. As will be appreciated, the fan 232 generally includes a plurality of fan blades 250 rotatable by the fan shaft 234 (and, for the depicted embodiment, the second engine shaft 230). The rotation of the fan blades 250 of the fan 232 increases a pressure of the inlet airflow. For the embodiment shown, the hypersonic propulsion engine 200 further includes a stage of guide vanes 252 located downstream of the plurality of fan blades 250 of the fan 232 and upstream of the turbine engine inlet 216 (and bypass duct inlet 240). For the embodiment shown, the stage of guide vanes 252 is a stage of variable guide vanes, each rotatable about its respective axis (shown in phantom). The guide vanes 252 may change a direction of the inlet airflow from the plurality of fan blades 250 of the fan 232. From the stage guide vanes 252, a first portion of the inlet airflow flows through the turbine engine inlet 216 and along a core air flowpath 254 of the turbine engine 202, and a second portion of the inlet airflow flows through the bypass duct 238 of the ducting assembly 204, as will be explained in greater detail below. Briefly, it will be appreciated that the exemplary hypersonic propulsion engine 200 includes a forward frame, the forward frame including a forward frame strut 256 (and, more specifically, a plurality of circumferentially spaced forward frame struts 256) extending through the bypass duct 238 proximate the bypass duct inlet 240 and through the core air flowpath 254 of the turbine engine 202 proximate the turbine engine inlet 216.

Generally, the first portion of air passes through the first compressor 220, wherein a temperature and pressure of such first portion of air is increased and provided to the combustion section 205. The combustion section 205 includes a plurality of fuel nozzles 258 spaced along the circumferential direction C for providing a mixture of compressed air and fuel to a combustion chamber of the combustion section 205. The compressed air and fuel mixture is combusted to generate combustion gases, which are provided through the turbine section. The combustion gases are expanded across the first turbine 224 and second turbine 226, driving the first turbine 224 (and first compressor 220 through the first engine shaft 228) and the second turbine 226 (and fan 232 through the second engine shaft 230). The combustion gases are then exhausted through the turbine engine exhaust 218 and provided to the afterburning chamber 246 of the ducting assembly 204.

As is depicted schematically, the hypersonic propulsion engine 200, and in particular, the turbine engine 202, includes a plurality of bearings 260 for supporting one or more rotating components of the hypersonic propulsion engine 200. For example, the depicted exemplary hypersonic propulsion engine 200/turbine engine 202 includes one or more bearings 260 supporting the first engine shaft 228 and the second engine shaft 230. For the embodiment shown, the one or more bearings 260 are configured as air bearings. Example air bearings that may be used include, but are not limited to, the air bearings described in U.S. Pat. No. 8,083,413 issued Dec. 27, 2011; U.S. Pat. No. 8,100,586 issued Jan. 24, 2012; U.S. Pat. No. 9,169,846 issued Oct. 27, 2015; U.S. Pat. No. 9,429,191 issued Aug. 30, 2016; U.S. Pat. No. 9,416,820 issued Aug. 16, 2016; U.S. Pat. No. 9,482,274 issued Nov. 1, 2016; and U.S. Pat. No. 10,066,505 issued Sep. 4, 2018, and each of which is incorporated herein fully by reference for all purposes.

It will be appreciated, however, that in other exemplary embodiments, the one or more bearings 260 may be formed in any other suitable manner. For example, in other embodiments, one or more of the bearings 260 may be roller bearings, ball bearings, etc.

Referring still to FIGS. 2 and 3, the second portion of the inlet airflow, as noted above, is provided through the bypass duct 238. Notably, for the embodiment shown, the bypass duct 238 includes a dual stream section. The dual stream section includes an inner bypass stream 262 and an outer bypass stream 264. The inner bypass stream 262 and outer bypass stream 264 are in a parallel flow configuration and, for the embodiment shown, extend at least partially outward of the first compressor 220 of the compressor section of the turbine engine 202. Notably, for the embodiment shown, the ducting assembly 204 includes an outer bypass stream door 266 located at an upstream end of the outer bypass duct stream 264. The outer bypass duct stream door 266 is movable between a closed position (shown) and an open position (depicted in phantom). The outer bypass stream door 266 substantially completely blocks the outer bypass stream 264 when in the closed position, such that substantially all of the second portion of the inlet airflow received through the bypass duct 238 flows through the inner bypass stream 262. By contrast, the outer bypass stream door 266 allows airflow through the outer bypass stream 264 when in the open position. Notably, the ducting assembly 204 is designed aerodynamically such that when the outer bypass stream door 266 is in the open position during hypersonic flight operating conditions, a ratio of an amount of airflow through the outer bypass duct stream 264 to an amount of airflow through the inner bypass duct 262 stream is greater than 1:1, such as greater than about 2:1, such as greater than about 4:1, and less than about 100:1, such as less than about 10:1.

Referring still to the dual stream section, and more particularly to the inner bypass stream 262, it will be appreciated that, for the depicted embodiment, the ducting assembly 204 further includes a stage of airfoils 268 positioned at least partially within the inner bypass stream 262. More particularly, for the embodiment shown, each compressor rotor blade of the forward-most stage of compressor rotor blades 222 of the first compressor 220 of the turbine engine 202 defines a radially outer end. The stage of airfoils 268 of the ducting assembly 204 is coupled to the forward-most stage of compressor rotor blades 222 at the radially outer ends. In such a manner, the stage of airfoils 268 is configured to be driven by, and rotate with, the first compressor 220 during at least certain operations. For the embodiment shown, the stage of airfoils 268 of the ducting assembly 204 is a stage of compression airfoils configured to compress the second portion of air flowing through the inner bypass duct stream 262, increasing a pressure and/or flowrate of such airflow.

Downstream of the dual stream section of the bypass duct 238, the second portion of the inlet airflow is merged back together and flows generally along the axial direction A to the bypass duct exhaust 242. For the illustrated embodiment, the airflow through the bypass duct 238 is merged with the exhaust gases of the turbine engine 202 at the afterburning chamber 246. The exemplary hypersonic propulsion engine 200 depicted includes a bypass airflow door 270 located at the turbine engine exhaust 218 and bypass duct exhaust 242. The bypass airflow door 270 is movable between an open position (shown) wherein airflow through the core air flowpath 254 of the turbine engine 202 may flow freely into the afterburning chamber 246, and a closed position (depicted in phantom), wherein airflow from the bypass duct 238 may flow freely into the afterburning chamber 246. Notably, the bypass airflow door 270 may further be movable between various positions therebetween to allow for a desired ratio of airflow from the turbine engine 202 to airflow from the bypass duct 238 into the afterburning chamber 246.

During certain operations, such as during hypersonic flight operations, further thrust may be realized from the airflow into and through the afterburning chamber 246. More specifically, for the embodiment shown, the hypersonic propulsion engine 200 further includes an augmenter 272 positioned at least partially within the afterburning chamber 246. Particularly, for the embodiment shown, the augmenter 272 is positioned at an upstream end of the afterburning chamber 246 and, more particularly, immediately downstream of the bypass duct exhaust 242 and turbine engine exhaust 218.

In some embodiments, the afterburning chamber 246 may be configured as a hyperburner chamber, and the augmenter 272 may incorporate a rotating detonation combustor. Exemplary rotating detonation combustors that may be incorporated into the augmenter 272 in the depicted exemplary hypersonic propulsion engine 200 include the systems disclosed in U.S. Patent App. Pub. No. 2018/0231256 filed Feb. 10, 2017; U.S. Patent App. Pub. No. 2018/0356094 filed Jun. 9, 2017; U.S. Patent App. Pub. No. 2018/03356099 filed Jun. 9, 2017; U.S. Patent App. Pub. No. 2018/0355792 filed Jun. 9, 2017; U.S. Patent App. Pub. No. 2018/0355795 filed Jun. 9, 2017, and each of which is incorporated herein fully by reference for all purposes.

Further, referring particularly to FIG. 2, it will be appreciated that the afterburning chamber 246 extends generally to the hypersonic propulsion engine exhaust 212, defining a nozzle outlet 282 at the hypersonic propulsion engine exhaust 212. Moreover, the afterburning chamber 246 defines an afterburning chamber axial length 284 between the turbine engine exhaust 218 and the hypersonic propulsion engine exhaust 212. Similarly, the turbine engine 202 defines a turbine engine axial length 286 between the turbine engine inlet 216 and the turbine engine exhaust 218. For the depicted embodiment, the afterburning chamber axial length 284 is at least about fifty percent of the turbine engine axial length 286 and up to about 500 percent of the turbine engine axial length 286. More particularly, for the embodiment shown, the afterburning chamber axial length 284 is greater than the turbine engine axial length 286. For example, in certain embodiments, the afterburning chamber 246 may define an afterburning chamber axial length 284 that is at least about 125 percent of the turbine engine axial length 286, such as at least about 150 percent of the turbine engine 202. However, in other embodiments (such as embodiments incorporating a rotating detonation combustor), the afterburning chamber axial length 284 may be less than the turbine engine axial length 286.

Moreover, it will be appreciated that in at least certain exemplary embodiments, the hypersonic propulsion engine 200 may include one or more components for varying a cross-sectional area of the nozzle outlet 282. As such, the nozzle outlet 282 may be a variable geometry nozzle outlet configured to change in cross-sectional area based on e.g., one or more flight operations, ambient conditions, etc.

Referring particularly to FIG. 3, as noted above, the hypersonic propulsion engine 200 includes the inlet precooler 248 position at least partially within the inlet section 244 of the ducting assembly 204 upstream of the turbine engine inlet 216, the bypass duct 238, or both for cooling the inlet airflow provided through the inlet section 244 to the turbine engine inlet 216, the bypass duct 238, or both. During hypersonic flight operations, the inlet airflow received through the inlet section 244 may be at a relatively high temperature due at least in part to one or more hypersonic shock waves generated. For example, the inlet airflow received through the inlet section 244 may be at a temperature greater than or equal to about 1000 degrees Fahrenheit, such as greater than equal to about 1500 degrees Fahrenheit, such as up to about 3000 degrees Fahrenheit. A turbine engine may not be able to function as desired receiving airflow at such temperatures. As such, including the inlet precooler 248 may allow for operation of the hypersonic propulsion engine 200 at such operating conditions by reducing the temperature of the inlet airflow provided through the inlet section 244 of the hypersonic propulsion engine 200. For instance, the inlet precooler 248 may be configured to reduce a temperature of the inlet airflow through the inlet section 244 of the ducting assembly 204 during hypersonic flight operations by at least about two hundred (200) degrees Fahrenheit, such as by at least about three hundred (300) degrees Fahrenheit, such as by at least about four hundred (400) degrees Fahrenheit, such as up to about 1,000 degrees Fahrenheit. Such may accordingly enable, at least in part, operation of the hypersonic propulsion engine 200 at such hypersonic flight operating conditions.

For the embodiment shown, it will be appreciated that the exemplary hypersonic propulsion engine 200 further includes a fuel delivery system 288. The fuel delivery system 288 is configured for providing a flow of fuel to the combustion section 205 of the turbine engine 202 and, for the embodiment shown, the augmenter 272 positioned at least partially within the afterburning chamber 246. The depicted exemplary fuel delivery system 288 generally includes a fuel tank 290 and a fuel oxygen reduction unit 292. The fuel oxygen reduction unit 292 may be configured to reduce an oxygen content of the fuel flow from the fuel tank 290 and through the fuel delivery system 288. For example, the fuel oxygen reduction unit 292 depicted in FIG. 3 may be configured in a similar manner to one or more the exemplary fuel oxygen reduction units described in U.S. Pat. No. 7,459,081 issued Dec. 2, 2008, and U.S. Patent App. Publication No. 20120216677, published Aug. 30, 2012, and each of which is incorporated herein fully by reference for all purposes. In other embodiments, the fuel delivery system 288 may be configured for delivery of a cold fuel, e.g., a fuel stored at cold temperatures (such as cryogenic or approaching cryogenic temperatures). For instance, the fuel may be liquid oxygen (LOX), liquid natural gas (LNG), liquid hydrogen (LH2), etc. In some embodiments, the fuel may be methane or the like, and in other embodiments, the fuel may be jet fuel (JP), such as JP-4 or JP-8.

The fuel delivery system 288 further includes a fuel pump 294 configured to increase a pressure of the fuel flow through the fuel delivery system 288. Further, for the embodiment shown, the inlet precooler 248 is a fuel-air heat exchanger thermally coupled to the fuel delivery system 288. More specifically, for the depicted embodiment, the inlet precooler 248 is configured to utilize fuel directly as a heat exchange fluid, such that heat extracted from the inlet airflow through the inlet section 244 of the ducting assembly 204 is transferred to the fuel flow through the fuel delivery system 288. For the embodiment shown, the heated fuel (which may increase in temperature by an amount corresponding to an amount that the inlet airflow temperature is reduced by the inlet precooler 248, as discussed above) is then provided to the combustion section 205 and/or the augmenter 272. Notably, in addition to acting as a relatively efficient heat sink, increasing a temperature of the fuel prior to combustion may further increase an efficiency of the hypersonic propulsion engine 200. Other heat exchangers utilizing fuel as a heat exchange fluid are described herein. As described in greater detail below, an exemplary heat exchanger 300 may be configured to utilize fuel to cool engine bleed air such that the cooled air, e.g., may be used for thermal management of systems external to the hypersonic propulsion engine 200, thermal protection of and/or within the engine structure, and/or for other thermal management functions.

Further, it will be appreciated that the hypersonic propulsion engine may further include additional features for enabling at least in part operation of the hypersonic propulsion engine 200 at such hypersonic flight operating conditions. For example, one or more components of the hypersonic propulsion engine 200 may be formed of a certain matrix composite (CMC) material. For instance, the fan blades 250 of the fan 232 and/or various components within the turbine engine 202 exposed to the core air flowpath 254, and particularly those components within the turbine section of the turbine engine 202, may be formed of a CMC material. More particularly, the rotor blades, stator vanes, liners, shrouds, etc. within the turbine engine 202, and particularly within the turbine section of the turbine engine 202, may be formed of a CMC material Notably, as used herein, ceramic matrix composite (CMC) material refers to a non-metallic material having high temperature capability. Exemplary CMC materials utilized for such components may include silicon carbide (SiC), silicon nitride, or alumina matrix materials and combinations thereof. Ceramic fibers may be embedded within the matrix, such as oxidation stable reinforcing fibers including monofilaments like sapphire and silicon carbide (e.g., Textron's SCS-6), as well as roving and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

Additionally or alternatively, the plurality of fan blades 250 of the fan 232 may be actively cooled fan blades, e.g., using bleed airflow from the compressor section cooled via a heat exchanger. In some embodiments, the cooling fluid provided to the fan blades 250 may circulate through the fan blades 250 and/or exit through one or more cooling holes in the fan blades 250, such as film cooling holes, for reducing a temperature of such fan blades 250. Additionally or alternatively, one more flowpath walls, such as an outer flowpath wall 296 of a nosecone or spinner 298 or an inner flowpath wall of the ducting assembly 204, may be exposed to substantially hypersonic airflow during operation of the hypersonic propulsion engine 200 in a hypersonic flight operation condition. The one or more flowpath walls may be formed at least partially of a sacrificial material such that, e.g., a flowpath surface may be designed to deteriorate during operation of the hypersonic propulsion engine 200 in a hypersonic flight operation. However, the propulsion engine 200 may be configured such that the one or more flowpath walls may be relatively easily replaced, e.g., in between flight operations, after a predetermined amount of time, in response to inspection or some other flight condition, etc.

Still further additional features for enabling at least in part operation of the hypersonic propulsion engine 200 at such hypersonic flight operating conditions may include one or more cooling assemblies or systems. For example, in some embodiments, the hypersonic propulsion engine 200 may include an intercooler integrated into, e.g., the forward frame strut 256 of the hypersonic propulsion engine 200 and/or one or more of the guide vanes of the turbine engine 202. In exemplary embodiments, the intercooler may be thermally coupled to the fuel delivery system 288 of the hypersonic propulsion engine 200 such that the intercooler utilizes a fuel flow as a heat exchange fluid. In some embodiments, the fuel flow through the fuel delivery system 288 may be similarly utilized as the heat exchange fluid for the inlet precooler 248, as in the embodiment of FIG. 3 described above, and in such a configuration, the fuel delivery system 288 may include parallel flows of fuel to the inlet precooler 248 and the intercooler, or alternatively, may include such flows in series. In still further embodiments, rather than a fuel-cooled intercooler, the intercooler may additionally, or alternatively, be an air-cooled intercooler.

In yet other embodiments, an intercooler may be positioned within the core air flowpath 254 of the turbine engine 202, at a location downstream of the turbine engine inlet 216 and upstream of the compressor section. More specifically, the turbine engine 202 may include a precooling duct upstream of the compressor section, and the intercooler may be positioned within the precooling duct. In some embodiments utilizing the downstream intercooler and precooling duct, the turbine section may include a single turbine 224, and the hypersonic propulsion engine 200 may not include a fan 232. Further, the hypersonic propulsion engine 200 may include an inlet door to the bypass duct 238 that is configured to vary a flow ratio of inlet airflow between the bypass duct 238 and core air flowpath 254 of the core turbine engine 202. In another embodiment there may be a fan forward of the intercooler driven by a turbine (not shown), which fan may be designed to accommodate the entire air flow stream temperature across the operating regime of the engine or may be internally cooled. In still further embodiments, a door or a pair of doors may be disposed downstream of the intercooler at a downstream end of the precooling duct that are capable of redirecting airflow through the bypass duct 238 into the core air flowpath 254. With the addition of the door(s), the intercooler (or inlet heat exchanger) may be bypassed during certain operations, e.g., low temperature operations. Alternatively, however, in other operations, the doors may be moved to a closed position such that airflow through the bypass duct 238 remains in the bypass duct 238 and airflow through the core air flowpath 254 of the turbine engine 202 remains in the core air flowpath 254 of the turbine engine 202. In other embodiments, the hypersonic propulsion engine 200 may comprise a stage of freespinning airfoils (i.e., not connected to any engine shaft of the turbine engine 202), which may include an inner stage of airfoils and an outer stage of airfoils. The inner stage of airfoils may be positioned within the core air flowpath 254 a location upstream of the intercooler, and the outer stage of airfoils may be positioned within the bypass duct 238. The stage of freespinning airfoils may, e.g., compress an airflow through the bypass duct 238, increasing a temperature of such airflow. In addition, the stage of freespinning airfoils may extract energy from airflow by expanding the core flow entering the heat exchanger. In yet another embodiment, the rotational energy may be transferred to a device, which may be a mechanical device, such as an accessory gearbox, or alternatively, may be an electrical device, such as an electric machine configured to extract electrical power from the rotational energy of the stage of freespinning airfoils.

Yet further, in some embodiments, the hypersonic propulsion engine 200 may include a thermal transport bus that may include, e.g., one or more heat sink exchangers and one or more heat source exchangers. The thermal transport bus also may include an intermediary heat exchange fluid flowing therethrough and may be formed of one or more suitable fluid conduits. The heat exchange fluid may be an incompressible fluid having a high temperature operating range, e.g., a water and ethanol mixture, or any suitable dielectric fluid. For example, the heat exchange fluid may be a thermal oil; a supercritical fluid such as supercritical carbon dioxide ($sCO_2$); a liquid metal; a standard industry refrigerant (R-### ANSI/ASHRAE designation), e.g., R-410a; or a noble gas or a mixture of noble gases, which also carry refrigerant designations. A compressor/pump may be provided in fluid communication with the heat exchange fluid in the thermal transport bus for generating a flow of the heat exchange fluid through the thermal transport bus. In exemplary embodiments, the one or more heat source exchangers may be in thermal communication with the heat exchange fluid in the thermal transport bus and may be configured to transfer heat from, e.g., one or more of the systems of the hypersonic propulsion engine 200 (or in operable communication with the hypersonic propulsion engine 200, such as the vehicle incorporating the hypersonic propulsion engine 200), one or more flowpath surfaces of the hypersonic propulsion system 200 and/or hypersonic vehicle 100, and/ or one or more accessory systems (e.g., a lubrication oil system, an electric machine, etc.) to the heat exchange fluid in the thermal transport bus. For example, the plurality of heat source exchangers may include the inlet precooler 248 and the intercooler thermally coupled to, or otherwise integrated into, the forward frame struts 256 of the hypersonic propulsion engine 200 within the core air flowpath 254 of the turbine engine 202. The one or more heat sink exchangers may be permanently or selectively in thermal communication with the heat exchange fluid in the thermal transport bus, located downstream of the plurality of heat source exchangers, and configured for transferring heat from the heat exchange fluid in the thermal transport bus, e.g., to atmosphere, to fuel, to a bypass stream, etc. In some embodiments, the thermal transport bus may utilize a refrigeration cycle to more efficiently remove heat from the various heat source exchangers and/or to allow for the transfer of heat from the thermal transport bus to relatively high temperature locations.

What is more, in some embodiments, a leading edge of a flowpath wall, such as a leading edge of the ducting assembly 204, a leading edge of the turbine engine 202 (such as the spinner 298), a leading edge of a wing of the vehicle or aircraft (e.g., wings 108, 110 of FIG. 1), a nose of the vehicle or aircraft (e.g., at forward end 102 of vehicle 100 of FIG. 1), etc., may be configured as a porous leading edge portion. A cooling assembly may be configured to provide a coolant flow through a cavity to the leading edge portion, such that the coolant flow may seep through the porous leading edge portion and cool the leading edge portion during operation of the hypersonic propulsion engine 200, e.g., during hypersonic flight operations. In some embodiments, the coolant flow may be a fuel-cooled bleed air flow, i.e., engine bleed air cooled by a fuel flow in a heat exchanger, such as heat exchanger 300 described in greater detail herein. As such, the heat exchanger may be configured to provide thermal protection within the engine 200 by cooling bleed air with fuel from the fuel tank 290. Moreover, the leading edge portion may define a variability in its porosity, e.g., to concentrate a cooling proximate a stagnation point (i.e., is configured as a variable porous section). As used herein, the term "porosity" with respect to a particular section refers to a ratio of open space to solid material within such section. Further, the coolant flow may be any suitable coolant material, e.g., the coolant flow may be a metal phase change material, such as a metal configured to change from a solid phase to liquid or gas phase when exposed to temperatures generated during operation of the hypersonic propulsion engine 200 during hypersonic flight operations. In some embodiments, the pores of the leading edge portion of the flowpath wall may be filled with a material, such as a metal material that may have a relatively low melting point, such that the metal filling the pores of the outer surface is configured to melt during operation of the hypersonic propulsion engine 200/hypersonic vehicle 100 during high temperature operations, such as hypersonic flight operations. Once the metal filling the pores of the outer surface of the leading edge portion is melted, the coolant may flow through the leading edge portion as previously described.

In still other embodiments, the flowpath wall defining the leading edge may include a plurality of layers of material with compliant interfaces embedded within the leading edge portion and spaced along a thickness of the flowpath wall. The compliant interfaces between the layers of material may effectively act to distribute heat at, e.g., the stagnation point along the leading edge to reduce a concentration of the heat at the stagnation point. The compliant interface may be a cavity with an internal volume and may be filled with a fluid which has relatively high heat transfer coefficient, such as liquid sodium.

Further, in still other embodiments, any other suitable hypersonic propulsion engine 200 structure may be utilized.

Turning now to FIGS. 4 through 11, the present subject matter also provides a heat exchanger, such as may be used with the hypersonic propulsion engine 200 and/or hypersonic vehicle 100. The heat exchanger 300 may be one of the heat exchangers described herein, such as the precooler 248, the intercooler, the thermal transport bus, the heat sink exchanger, and/or the heat source exchanger. Additionally or alternatively, the heat exchanger 300 may be another heat exchanger of the hypersonic propulsion engine 200 and/or hypersonic vehicle 100. For example, the heat exchanger 300 may be used to cool air during hypersonic flight operations, where the airflow to the engine 200 and/or about the vehicle 100 (i.e., the ambient air) may be at a relatively high temperature due at least in part to one or more hypersonic shock waves generated, such that the air may be used to cool one or more systems of the engine 200 and/or vehicle 100. In exemplary embodiments, the heat exchanger 300 may be used to cool bleed air from a hypersonic propulsion engine for thermal management of systems outside the engine. In other embodiments, however, the cooled bleed air of a hypersonic propulsion engine may be returned to the engine to be used for thermal protection of one or more engine components.

Figure 4:
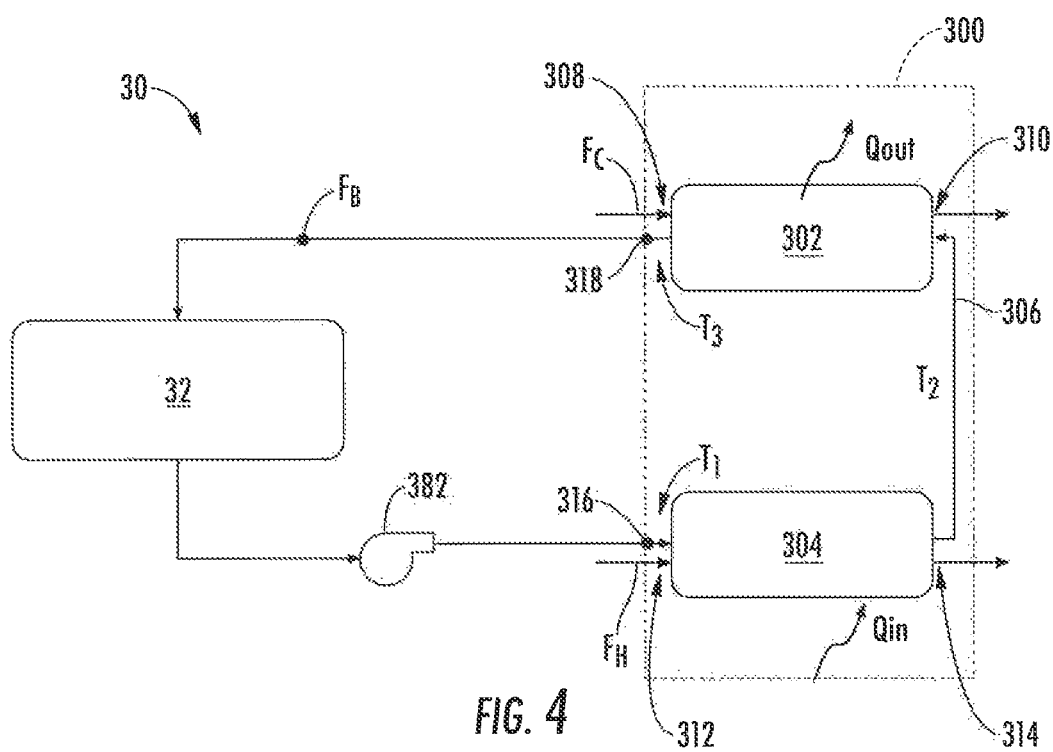
FIG. 4 is a schematic flow diagram of a heat exchanger system in accordance with an exemplary embodiment of the present subject matter.

In an exemplary embodiment, referring briefly to FIGS. 2 and 3, the heat exchanger 300 may be disposed outside of the outer case 236, between the fuel tank 290 and a location where the fuel enters the hypersonic propulsion engine 200. Referring now to FIG. 4, a schematic flow diagram is provided, illustrating a flow of buffer fluid within a heat exchanger system including the heat exchanger 300, according to an exemplary embodiment of the present subject matter. As shown in FIG. 4, the exemplary heat exchanger 300 includes a first chamber 302 and a second chamber 304, with a buffer fluid $F_B$ circulating in a buffer fluid flowpath 306 that is disposed between the first chamber 302 and the second chamber 304. The first chamber 302 may receive a flow of a cool fluid $F_C$, and the second chamber 304 may receive a flow of a hot fluid $F_H$. The buffer fluid $F_B$ circulates within the buffer fluid flowpath 306 to transfer heat from the hot fluid $F_H$ to the cool fluid $F_C$, e.g., to reduce a temperature of the hot fluid $F_H$ upon exiting the second chamber 304. As used herein, it will be appreciated that the buffer fluid $F_B$ is a fluid flowing between the hot fluid $F_H$ and the cool fluid $F_C$ to facilitate heat transfer between the hot and cool fluids $F_H$, $F_C$. More particularly, the cool fluid $F_C$, hot fluid $F_H$, and buffer fluid $F_B$ are physically isolated from one another, but each of the cool fluid $F_C$ and hot fluid $F_H$ are in thermal communication with the buffer fluid $F_B$. As further described herein, the buffer fluid $F_B$ is disposed between the cool fluid $F_C$ and the hot fluid $F_H$ such that a crack in or failure of any single wall does not result in contact between the cool fluid $F_C$ and the hot fluid $F_H$. Although the cool fluid $F_C$ and the buffer fluid $F_B$ could mix if a wall separating the cool and buffer fluids $F_C$, $F_B$ cracks or fails, or the hot fluid $F_H$ and the buffer fluid $F_B$ could mix if a wall separating the hot and buffer fluids $F_H$, $F_B$ cracks or fails, the heat exchanger 300 may be designed as described herein to tolerate a failure between the cool and buffer fluids $F_C$, $F_B$ or the hot and buffer fluids $F_H$, $F_B$ without creating a potentially dangerous mixture of the cool and hot fluids $F_C$, $F_H$. Moreover, it will be understood that the fluid $F_B$ separating the cool and hot fluids $F_C$, $F_H$ may be referred to as either a buffer fluid or a barrier fluid.

In an exemplary embodiment in which the heat exchanger 300 is used with the hypersonic propulsion engine 200, the cool fluid $F_C$ may be the fuel provided to the combustion section 205, which may be cryogenic or near-cryogenic as described above, and the hot fluid $F_H$ may be bleed air, e.g., from the engine inlet 208 and/or the turbine engine inlet 216. In such embodiments, the heat exchanger 300 may be thermally coupled to the fuel delivery system 288 of the hypersonic propulsion engine 200 and to bleed air from the engine 200, such that the heat exchanger 300 utilizes a fuel flow as a heat exchange fluid and an airflow as a heat exchange fluid.

As illustrated schematically in FIG. 4, the first chamber 302 may include a first inlet 308 for an ingress of the cool fluid $F_C$ into the first chamber 302 and a first outlet 310 for an egress of the cool fluid $F_C$ from the first chamber 302. The second chamber 304 may include a second inlet 312 for an ingress of the hot fluid $F_H$ into the second chamber 304 and a second outlet 314 for an egress of the hot fluid $F_H$ from the second chamber 304. Similarly, the buffer fluid flowpath 306 may include a buffer fluid inlet 316 for an ingress of the buffer fluid $F_B$ into the buffer fluid flowpath 306 and a buffer fluid outlet 318 for an egress of the buffer fluid $F_B$ from the buffer fluid flowpath 306.

As shown in FIG. 4, a heat exchanger system 30 may include the heat exchanger 300 and a buffer fluid heat exchanger 32 for regulating the temperature of the buffer fluid $F_B$, e.g., based on the requirements of the system 30. More particularly, heat enters the system 30 within the heat exchanger 300 via the hot fluid $F_H$, and heat exits the system 30 via the cool fluid $F_C$. In FIG. 4, the input of heat is represented by $Q_{in}$ and the output of heat is represented by $Q_{out}$. The buffer fluid $F_B$ circulating through the buffer fluid flowpath 306 facilitates the exchange of heat between the hot fluid $F_H$ and the cool fluid $F_C$. For example, a large temperature differential $\Delta T$ may exist between the hot fluid $F_H$ and the cool fluid $F_C$, and the buffer fluid flowpath 306 may provide a layer of the buffer fluid $F_B$ between the hot fluid $F_H$ and the cool fluid $F_C$ to help in thermal strain management of the materials forming the heat exchanger 300.

In an exemplary embodiment, buffer fluid $F_B$ flows into the heat exchanger 300 via the buffer fluid inlet 316 at a first temperature $T_1$. Through the exchange of heat $Q_{in}$, the hot fluid $F_H$ heats the buffer fluid $F_B$ to a second temperature $T_2$, and through the exchange of heat $Q_{out}$, the cool fluid $F_C$ cools the buffer fluid $F_B$ to a third temperature $T_3$. Generally, $Q_{in}$ may be greater than $Q_{out}$ such that $T_3$ is greater than $T_1$ and additional heat must be removed by the buffer fluid heat exchanger 32 to thermodynamically close the cycle of the heat exchanger system 30. However, the system 30 may be designed such that $Q_{in}$ is less than $Q_{out}$. For instance, in embodiments in which the cool fluid $F_C$ is fuel of a hypersonic propulsion engine such as engine 200 and the hot fluid $F_H$ is bleed air from the hypersonic propulsion engine, the flow of the hot fluid or bleed air $F_H$ may be regulated to balance the thermal capacity of the flow of the cool fluid or fuel $F_C$. Alternatively, the flow of the cool fluid or fuel $F_C$ may be increased to meet the demand of the hot fluid or bleed air $F_H$, and the extra fuel not required by the hypersonic propulsion engine 200 may be recirculated by the fuel tank 290. In embodiments in which $Q_{in}$ is less than $Q_{out}$, the buffer fluid heat exchanger 32 must add heat (rather than remove heat) to thermodynamically close the cycle of the heat exchanger system 30. The buffer fluid heat exchanger 32 may utilize bleed air from one or more engine systems to heat the buffer fluid $F_B$, which exits the heat exchanger 300 at a third temperature $T_3$ that is less than the first temperature $T_1$ in these embodiments because more heat was removed from the buffer fluid $F_B$ in the first chamber 302 than was added to the buffer fluid $F_B$ in the second chamber 304. Such heating of the buffer fluid $F_B$ may provide additional engine cooling capacity, e.g., for one or more lubricating oil systems, sump/bearing cooling systems, inlet/exhaust cooling systems, etc. In some embodiments, the buffer fluid heat exchanger 32 may be part of a control system that regulates heat transfer into and/or out of the buffer fluid $F_B$ via the buffer fluid heat exchanger 32 based on one or more sensed conditions, such as the first temperature $T_1$ and the third temperature $T_3$.

Further, capacity control of the flow of buffer fluid may be used to drive a component thermal time constant, accommodate different rate transients from either the hot or cool fluid stream, and/or to allow partial regenerator functionality. More particularly, as described herein, the buffer fluid $F_B$ is an active intermediate buffer layer that may be driven, e.g., by a recirculation pump 382 or other mechanical means or by natural convection, for thermal capacity control. In some embodiments, such thermal capacity control may drive a component thermal time constant. Additionally or alternatively, the ability to control the thermal capacity of the buffer fluid $F_B$, e.g., by varying the flow rate of the buffer fluid $F_B$, may allow partial regenerator functionality of the buffer fluid $F_B$. Moreover, thermal capacity control via the active buffer fluid $F_B$ may accommodate different rate transients from either the flow of the hot fluid $F_H$ or the cool fluid $F_C$. For instance, the flow rate of the buffer fluid $F_B$ may be varied to accommodate changes in the flow of the hot fluid $F_H$ and/or the flow of the cool fluid $F_C$. More particularly, the flow rate of the buffer fluid $F_B$ may be altered to allow a transient lag between sudden changes, e.g., in the flow rate of the hot fluid $F_H$ or the flow rate of the cool fluid $F_C$, to help avoid the effects of thermal shock within the heat exchanger 300. As an example, where the cool fluid $F_C$ is fuel of a hypersonic propulsion engine (such as engine 200) and the hot fluid $F_H$ is bleed air of the hypersonic propulsion engine, the flow rate of the fuel may be relatively high or low, e.g., depending on an engine operating condition, and the flow rate of the fuel may relatively quickly change from high to low or vice versa. To avoid thermal shock within the heat exchanger 300 due to the sudden change in heat exchange capacity resulting from the change in the flow of the fuel (the cool fluid), the flow rate of the buffer fluid $F_B$ may be increased or decreased to provide a transient lag where the buffer fluid $F_B$ is absorbing the effects of the sudden change in fuel flow rate.

Figure 5:
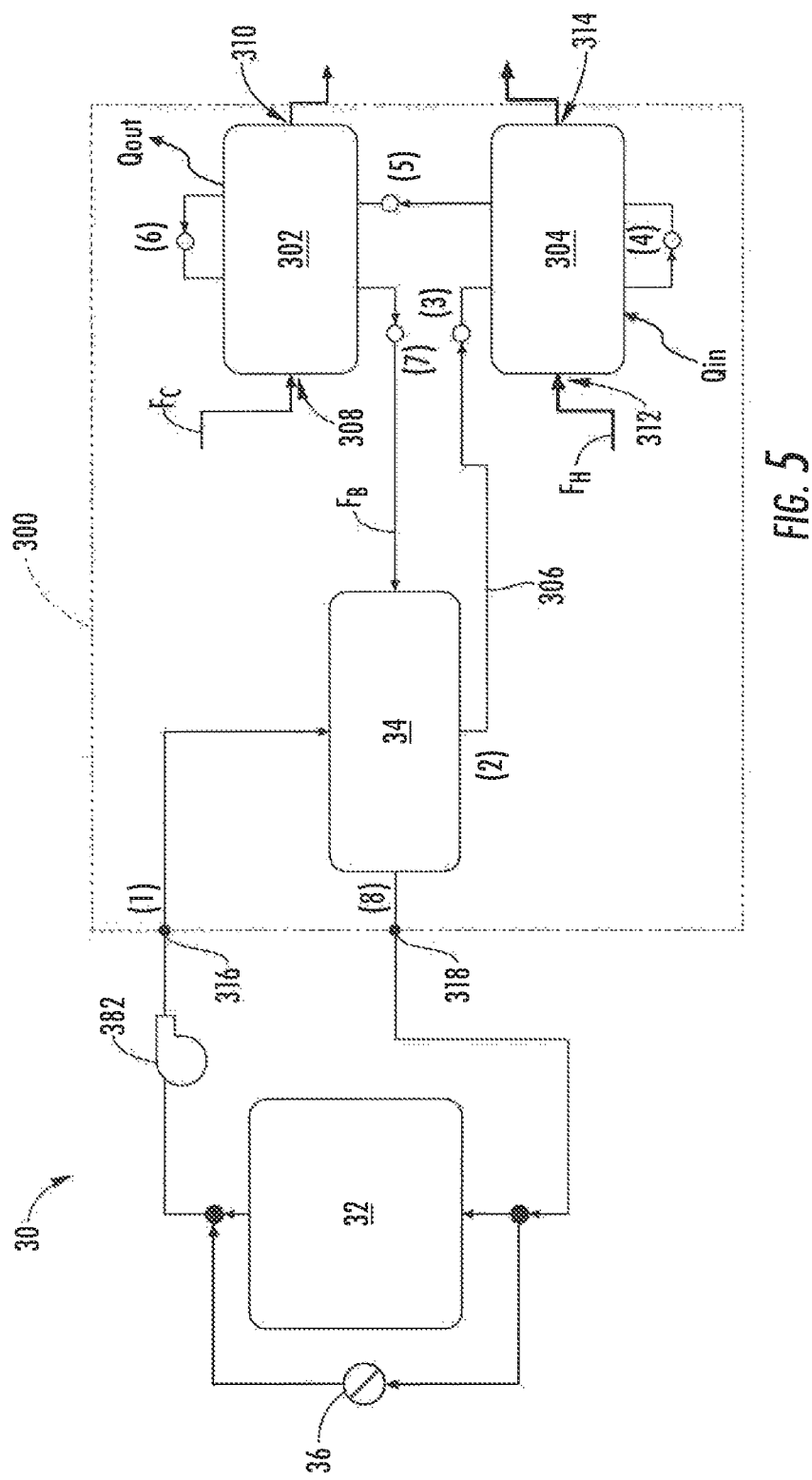
FIG. 5 is a schematic flow diagram of a heat exchanger system in accordance with another exemplary embodiment of the present subject matter.

Referring now to FIG. 5, a schematic flow diagram is provided, illustrating a flow of buffer fluid within the heat exchanger system 30, according to another exemplary embodiment of the present subject matter. As depicted in FIG. 5, the heat exchanger system 30 may include a buffer fluid recuperator in addition to the buffer fluid heat exchanger 32. The configuration illustrated in FIG. 5 is one example configuration of the heat exchanger system 30 in which $Q_{in}$ is less than $Q_{out}$.

The flow of buffer fluid $F_B$ through the system 30 as illustrated in the exemplary embodiment of FIG. 5 may be described in terms of stations (1) through (8), which represent different locations along the buffer fluid flowpath 306. Referring to station (1), buffer fluid FB flows into the heat exchange module or heat exchanger 300 at the a first station temperature $T_{(1)}$. From station (1) to station (2), the buffer fluid recuperator 34 cools the buffer fluid $F_B$, e.g., to maximize the temperature differential $\Delta T$ at the second chamber 304. As represented at station (3), the buffer fluid $F_B$ cools an external portion of the second chamber 304 and heats the buffer fluid $F_B$, e.g., the buffer fluid flowpath 306 may be in contact with an outer surface 322 of the second chamber 304 to cool the outside of the second chamber 304 while heating the buffer fluid $F_B$. Then, as shown at station (4), the buffer fluid $F_B$ traverses the second chamber 304 (as described in greater detail below) to provide further cooling of the hot fluid $F_H$ and heating of the buffer fluid $F_B$.

Next, as shown at station (5), the discharge of the buffer fluid $F_B$ from the second chamber 304 heats an external portion of the first chamber 302 and cools the buffer fluid $F_B$, e.g., the buffer fluid flowpath 306 may be in contact with an outer surface 320 of the first chamber 302 to heat the outside of the first chamber 302 while cooling the buffer fluid $F_B$. As depicted at station (6), the buffer fluid $F_B$ traverses the first chamber 302 (as described in greater detail below) to further heat the cool fluid $F_C$ and cool the buffer fluid $F_B$. At station (7), the discharge from the first chamber 302, the buffer fluid $F_B$ is cooler than at station (1), i.e., $Q_{out}$ is greater than $Q_{in}$ for the depicted exemplary embodiment of the heat exchanger system 30, such that the first station temperature $T_{(1)}$ is greater than the seventh station temperature $T_{(7)}$. From station (7) to station (8), the buffer fluid $F_B$ flows through the buffer fluid recuperator 34, leading to an increase in the temperature of the buffer fluid, i.e., the eighth station temperature $T_{(8)}$ is greater than the seventh station temperature $T_{(7)}$ ($T_{(8)} > T_{(7)}$) for recuperating the temperature decrease from the first station temperature $T_{(1)}$ to the second station temperature $T_{(2)}$, the temperature at the inlet to the second chamber 304. Finally, from station (8) to station (1), additional heat is added back to the buffer fluid $F_B$ from, e.g., one or more other engine systems via the buffer fluid heat exchanger 32.

In some embodiments, the heat exchange system 30 may include a bypass valve 36, such that the buffer fluid $F_B$ may bypass or not pass through the buffer fluid heat exchanger 32. For example, during some operating conditions of the hypersonic propulsion engine 200, it may be unnecessary and/or undesirable to add heat to the buffer fluid $F_B$ as described herein. Additionally or alternatively, the other engine system(s) may not have available discharge or bleed heat (e.g., the other system(s) may not have heated up to a temperature from which discharge or bleed air from such system(s) could heat the buffer fluid $F_B$ above the eighth station temperature $T_{(8)}$). In such embodiments, the bypass valve 36 may control the flow of the buffer fluid $F_B$ to the buffer fluid heat exchanger 32, e.g., the bypass valve 36 may be in an open position to allow the buffer fluid $F_B$ to bypass the buffer fluid heat exchanger 32 and may be in a closed position to allow the buffer fluid $F_B$ to flow through the buffer fluid heat exchanger 32. Further, it will be understood that the buffer fluid heat exchanger 32 may include one or more embedded shunt flow and/or pressure control valves, e.g., for controlling the flow of buffer fluid $F_B$ through the buffer fluid heat exchanger 32 and/or the heat exchanger system 30. In some embodiments, the buffer fluid heat exchanger 32 may be configured as a buffer fluid input/output matrix heat exchanger.

It will be appreciated that the heat exchanger systems 30 shown and described with respect to FIGS. 4 and 5 are by way of example only. The heat exchanger systems 30 may have any other suitable configuration. Further, in appropriate embodiments, the heat exchanger 300 may be utilized with a buffer fluid heat exchanger 32 and/or a buffer fluid recuperator 34.

Turning now to FIGS. 6-11, one examples of the heat exchanger 300 will be described in greater detail. As will be appreciated from the foregoing discussion of FIGS. 4 and 5, the buffer fluid $F_B$ aids in the exchange of heat between the hot fluid $F_H$ and the cool fluid $F_C$. Generally, a temperature of the cool fluid $F_C$ at the first inlet 308 is less than a temperature of the cool fluid $F_C$ at the first outlet 310, and a temperature of the hot fluid $F_H$ at the second inlet 312 is greater than a temperature of the hot fluid $F_H$ at the second outlet 314. That is, the cool fluid $F_C$ is warmed as it passes through the first chamber 302, and the hot fluid $F_H$ is cooled as it passes through the second chamber 304. As described herein, the buffer fluid $F_B$ helps transfer heat from the hot fluid $F_H$ to the cool fluid $F_C$, which lowers the temperature of the hot fluid $F_H$ from its ingress into the heat exchanger 300 to its egress from the heat exchanger 300 and raises the temperature of the cool fluid $F_C$ from its ingress into the heat exchanger 300 to its egress from the heat exchanger 300. Further, the buffer fluid $F_B$ also may help insulate the first or cool fluid chamber 302 from the second or hot fluid chamber 304. That is, the temperature differential $\Delta T$ between the hot fluid $F_H$ and the cool fluid $F_C$ may be so great or large that it would unduly or disadvantageously strain the physical structure of the heat exchanger 300 if the second or hot fluid chamber 304 was positioned in contact with the first or cool fluid chamber 302. For example, the structure of the heat exchanger 300 could deform or even break or rupture, which could lead to a fire or other unwanted event, e.g., depending on the volatility or composition of the hot fluid $F_H$ and/or cool fluid $F_C$, such as embodiments in which the cool fluid is fuel of a hypersonic propulsion engine and the hot fluid is air at the engine intake during hypersonic flight. Thus, the heat exchanger 300 may be designed to isolate the hot fluid $F_H$ from the cool fluid $F_C$ while still promoting heat exchange between the hot fluid $F_H$ and the cool fluid $F_C$.

Figure 6:
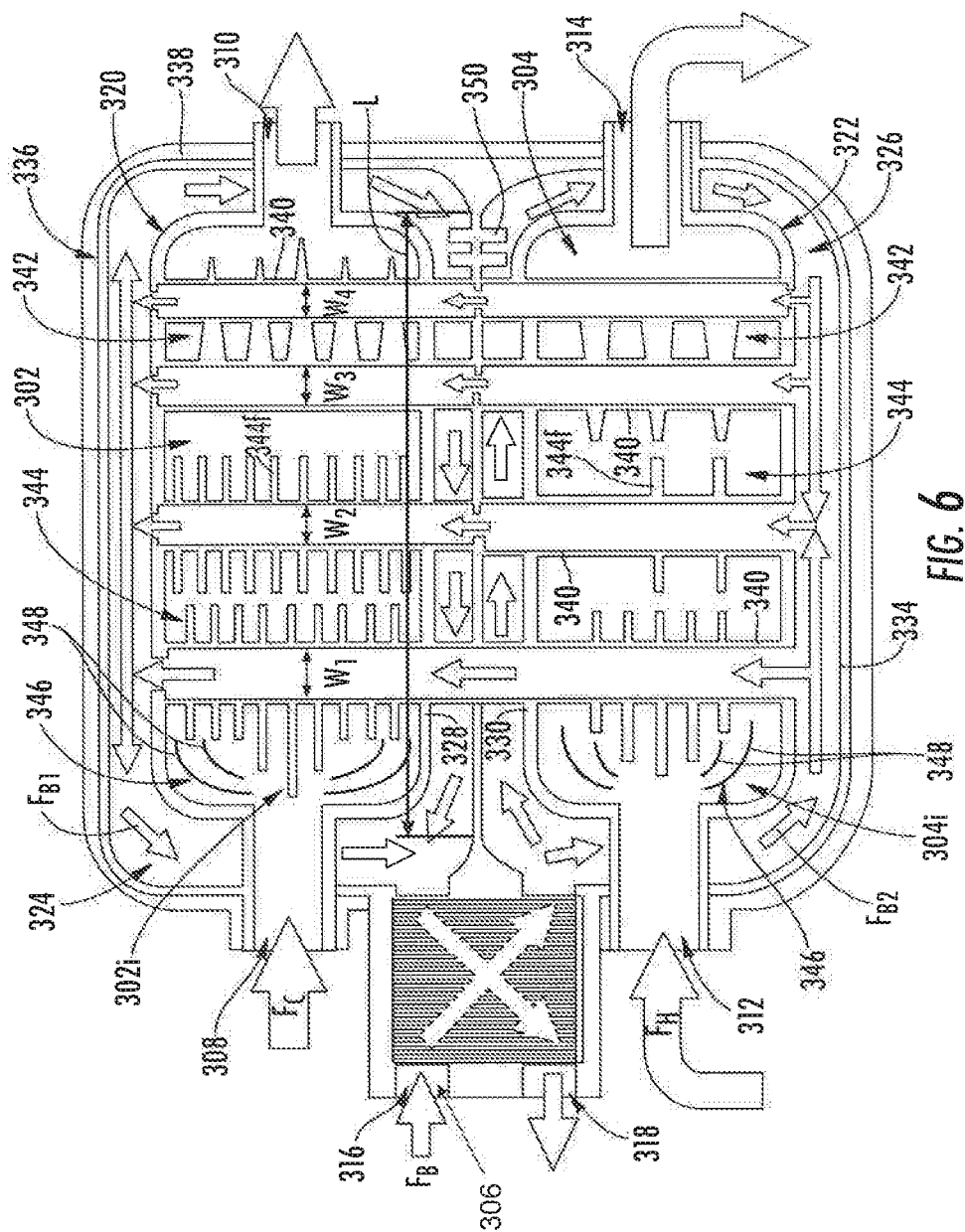
FIG. 6 is a cross-sectional, schematic view of a heat exchanger in accordance with an exemplary embodiment of the present subject matter.

FIG. 6 provides a schematic cross-sectional view of a heat exchanger 300 according to an exemplary embodiment of the present subject matter. As shown in FIG. 6, the buffer fluid flowpath 306 comprises a first segment 324 surrounding the first chamber 302 and a second segment 326 surrounding the second chamber 304. The first segment 324 of the buffer fluid flowpath 306 is in thermal communication with the second segment 326 of the buffer fluid flowpath 306 along a length L. As shown by arrows $F_{B1}$ and $F_{B2}$, the buffer fluid $F_B$ may circulate in a first direction $F_{B1}$ in the first segment 324 and in a second direction $F_{B2}$ in the second segment 326. In exemplary embodiments, the first direction $F_{B1}$ is different from the second direction $F_{B2}$ such that a counter-flow or cross-flow of the buffer fluid $F_B$ is established along the length L. For instance, in some embodiments, the first direction $F_{B1}$ is opposite the second direction $F_{B2}$.

The counter-flow of the buffer fluid $F_B$ helps promote heat transfer between the fluids or helps keep the heat transfer rate high. More particularly, if the buffer fluid $F_B$ was flowing in the same direction along the length L, the heat transfer rate would deteriorate as the buffer fluid $F_B$ flowed away from the first and second inlets 308, 312 toward the first and second outlets 310, 314 and the temperature of the hot fluid $F_H$ and the cool fluid Fc moved toward an equilibrium temperature. By establishing a counter-flow of the buffer fluid $F_B$ along the length L, a greater proportion of the heat transfer capacity of the buffer fluid $F_B$ may be utilized, which may result in a greater or higher rate of heat transfer compared to, e.g., a parallel flow of the buffer fluid $F_B$. Further, counter-flow of the buffer fluid $F_B$ may provide buffer fluid recuperation, which helps keep the buffer fluid layer at a somewhat uniform temperature that may reduce the effects of the mechanical load due to the temperature difference $\Delta T$ (which may be large) between the hot fluid $F_H$ and the cool fluid $F_C$. For example, the counter-flow buffer fluid recuperation may reduce local thermal strains and global deflections.

As further illustrated in FIG. 6, the first segment 324, which surrounds the first chamber 302, may be disposed adjacent the second segment 326, which surrounds the second chamber 304. The buffer fluid flowpath 306 thereby forms a "jacket" around each of the first chamber 302 and second chamber 304. The buffer fluid jacket may provide several advantages, as described herein. For instance, the buffer fluid jacket may provide fire suppression in the event of a leak or larger failure in which the cool fluid $F_C$ comes in contact with or mixes with the hot fluid $F_H$. More specifically, for embodiments in which the hot fluid $F_H$ is engine bleed air and the cool fluid $F_C$ is fuel, the buffer fluid $F_B$ may displace oxygen in the hot bleed air and thereby prevent a fire. As described in greater detail herein, the buffer fluid $F_B$ may be a refrigerant or other fluid known to be a fire suppressant.

Keeping with FIG. 6, a first wall 328 may separate the first chamber 302 from the buffer fluid flowpath 306 and a second wall 330 may separate the second chamber 304 from the buffer fluid flowpath 306. In the depicted embodiment, the first wall 328 is a portion or wall of the first chamber 302 and the second wall 330 is a portion or wall of the second chamber 304. Accordingly, in the depicted exemplary embodiment, the first wall 328 is disposed adjacent the second wall 330, with a portion of each of the first segment 324 and second segment 326 of the buffer fluid flowpath 306 positioned between the first and second walls 328, 330. More particularly, the first wall 328 and the second wall 330 may define at least a portion of the buffer fluid flowpath 306 that extends between the first chamber 302 and the second chamber 304 such that the flow of the cool fluid $F_C$ is separated from the flow of the hot fluid $F_H$ by the flow of buffer fluid $F_B$. More particularly still, in the illustrated exemplary embodiment, the buffer fluid flowpath 306 comprises a third wall 332 that is disposed between the first wall 328 and the second wall 330; the third wall 332 defines the length L. The first wall 328 and the third wall 332 define a portion of the first segment 324 of the buffer fluid flowpath 306, and the second wall 330 and the third wall 332 define a portion of the second segment 326 of the buffer fluid flowpath 306. Thus, in the exemplary embodiment of FIG. 6, the cool fluid $F_C$ is separated from the hot fluid $F_H$ by three walls: the first wall 328, the second wall 330, and the third wall 332.

Further, the first and second segments 324, 326 of the buffer fluid flowpath 306, which share the third wall 332 in the depicted embodiment of FIG. 6, include an outer wall 334 defining an outer surface 336, which surrounds or extends about the heat exchanger 300. That is, the outer wall 334 surrounds each of the first chamber 302, the second chamber 304, and the buffer fluid flowpath 306 such that the first chamber 302, the second chamber 304, and the buffer fluid flowpath 306 are each disposed within a volume defined by the outer wall 334. As shown in FIG. 6, a thermal insulation 338 may surround the outer surface 336, e.g., to help insulate the heat exchanger 300 from the external environment such that the external environment does not influence the exchange of heat between the hot fluid $F_H$, the cool fluid $F_C$, and the buffer fluid $F_B$. Moreover, the thermal insulation 338 may be applied around the intake side of both the cool and hot fluids $F_C$, $F_H$, i.e., near the first inlet 308 and the second inlet 312. Insulating the hot intake side may help prevent the hot fluid $F_H$ from heating the area in which the heat exchanger 300 is installed, such as an engine bay of a hypersonic vehicle or aircraft, and insulating the cool intake side may help prevent the area in which the heat exchanger 300 is installed, such as the engine bay, from heating the cool fluid $F_C$. Examples of thermal insulation 338 that may be used to insulate the heat exchanger 300 include, but are not limited to, one or more of the following: vacuum insulation, with or without vapor-cooled heat shields and/or with or without multi-layer insulation blankets; double-aluminized Mylar® or BoPET (biaxially-oriented polyethylene terephthalate), either dimpled or with a fabric spacer; double-goldized Mylar® or BoPET, either dimpled or with a fabric spacer; vacuum-panel insulation; foam with vapor barrier; evacuated powder, e.g., diatomaceous earth; silica aerogel; silica, glass fiber, or micropore ceramic systems encapsulated in metal linings and/or fiber and/or cloth blanks; and fiber blankets.

Referring still to FIG. 6, the buffer fluid flowpath 306 may comprise at least one cross-flow tube 340 oriented substantially perpendicular to the first chamber 302 and the second chamber 304 and extending from the first segment 324 to the second segment 326 of the buffer fluid flowpath 306. It will be appreciated that the cross-flow tubes 340 need not be oriented perpendicular to each chamber 302, 304 but may have any orientation with respect to the chambers 302, 304. For instance, the cross-flow tubes 340 may be disposed in any suitable configuration for allowing the buffer fluid $F_B$ to flow from one segment 324, 326 to the other segment 324, 326. The orientation of the cross-flow tubes 340 may be significant in embodiments of the heat exchanger 300 employing different means for driving the buffer fluid $F_B$ along the buffer fluid flowpath 306. For example, a particular orientation of the cross-flow tubes 340 may be better for a thermosiphon-type application, where the heat exchanger 300 utilizes natural convection to drive circulation of the buffer fluid $F_B$, while the orientation of the cross-flow tubes 340 may not matter in embodiments in which a pump is used to drive circulation of the buffer fluid $F_B$. In the depicted embodiment, the heat exchanger 300 includes four cross-flow tubes 340, but one, two, three, or more than four cross-flow tubes 340 may be included in embodiments of the heat exchanger 300 having at least one cross-flow tube 340. As shown in FIG. 6, the buffer fluid $F_B$ flows in the cross-flow tubes 340 from the second segment 326 to the first segment 324, and the flow of the buffer fluid $F_B$ in the cross-tubes 340 is perpendicular to both the flow of cool fluid $F_C$ and flow of hot fluid $F_H$.

In some embodiments, the cross-flow tube(s) 340 may be a coated or uncoated tube array; when a coating is provided, the coating may be selected based on the working fluid, i.e., the buffer fluid $F_B$. Additionally or alternatively, the cross-flow tube(s) 340 may or may not include internal fins, internal flow rate-metering, turbulating or mixing features, and/or boundary layer restarting features. As illustrated in FIG. 6, some embodiments of the heat exchanger 300 may include a plurality of cross-flow tubes 340 that vary in diameter or width. For example, as shown in FIG. 6, the cross-flow tubes 340 decrease in diameter or width from left to right. More particularly, a first cross-flow tube 340 nearest the inlets 308, 312 has a larger diameter or width $w_1$ than the cross-flow tube 340 to its right, which is a second cross-flow tube and has a larger diameter or width $w_2$ than the cross-flow tube 340 to its right, which is a third cross-flow tube and has a larger diameter or width $w_3$ than the cross-flow tube 340 to the cross-flow tube 340 to its right, which is a fourth cross-flow tube 340 and is nearest the outlets 310, 314 and has a diameter or width $w_4$. In other embodiments, two or more of the cross-flow tubes 340 may have the same diameter or width; in some embodiments, all of the cross-flow tubes 340 may have the same width. In still other embodiments, the diameter or width of one or more cross-flow tubes 340 may vary along the length of the tube(s) 340. For example, the diameter or width of a cross-flow tube 340 may continuously taper from one end to an opposite end, where the two ends are separated by the length of the tube 340 and the one end may be disposed at either the first segment 324 or the second segment 326 of the buffer fluid flowpath 306 and the opposite end may be disposed at the other of the first segment 324 and the second segment 326. As another example, the diameter or width of a cross-flow tube 340 may undergo step changes, rather than a continuous change, between the two ends, i.e., the tube 340 may include step changes in its diameter or width along its flow length.

Additionally or alternatively, one or more cross-flow tubes 340 of the heat exchanger 300 may include an external baffle array 342 with a variable flow area, e.g., contracting or expanding, within the respective chamber 302, 304. Still further, one or more cross-flow tubes 340 may include an external fin array 344. The fins 344f of the array 344 may have various geometries, e.g., the fins 344f may have a graded geometry, uniform geometry, tapered geometry, and/or variable pitch geometry.

As also depicted in FIG. 6, the first chamber 302 and/or the second chamber 304 may include a vane array 346 near the respective inlet 308, 312. The vane array 346 may provide flow distribution guides at the chamber inlet 308, 312. For example, in embodiments of the first chamber 302 including a vane array 346 and in which the cool fluid $F_C$ is fuel of a hypersonic propulsion engine (such as engine 200), the vane array 346 may be positioned in a fuel inlet manifold header volume 302i of the first chamber 302. Similarly, in embodiments of the second chamber 304 including a vane array 346 and in which the hot fluid $F_H$ is bleed air of a hypersonic propulsion engine (such as engine 200), the vane array 346 may be positioned in an air inlet flow diffuser volume 304i of the second chamber 304. The vanes 348 of each vane array 346 may help guide or diffuse the respective fluid $F_C$, $F_H$ throughout the volume of its respective chamber 302, 304.

Additionally or alternatively, the first chamber 302, the second chamber 304, and the buffer fluid flowpath 306, including the cross-flow tubes 340, may include turbulators or other heat transfer enhancement features, such as internal fins 350, e.g., to aid in the exchange of heat between the hot fluid $F_H$, the buffer fluid $F_B$, and the cool fluid $F_C$. As shown in FIG. 6, the buffer fluid flowpath fins 350 may be defined along the third wall 332, but the fins 350 may be included in other areas as well. For example, the fins 350 may be defined along either or both of the first wall 328 and second wall 330 and project into the buffer fluid flowpath 306. As another example, the fins 350 may be defined along a wall of the first chamber 302 opposite the first wall 328 and project into the first segment 324 of the buffer fluid flowpath 306 and/or the fins 350 may be defined along a wall of the second chamber 304 opposite the second wall 330 and project into the first segment 324 of the buffer fluid flowpath 306.

Figure 7:
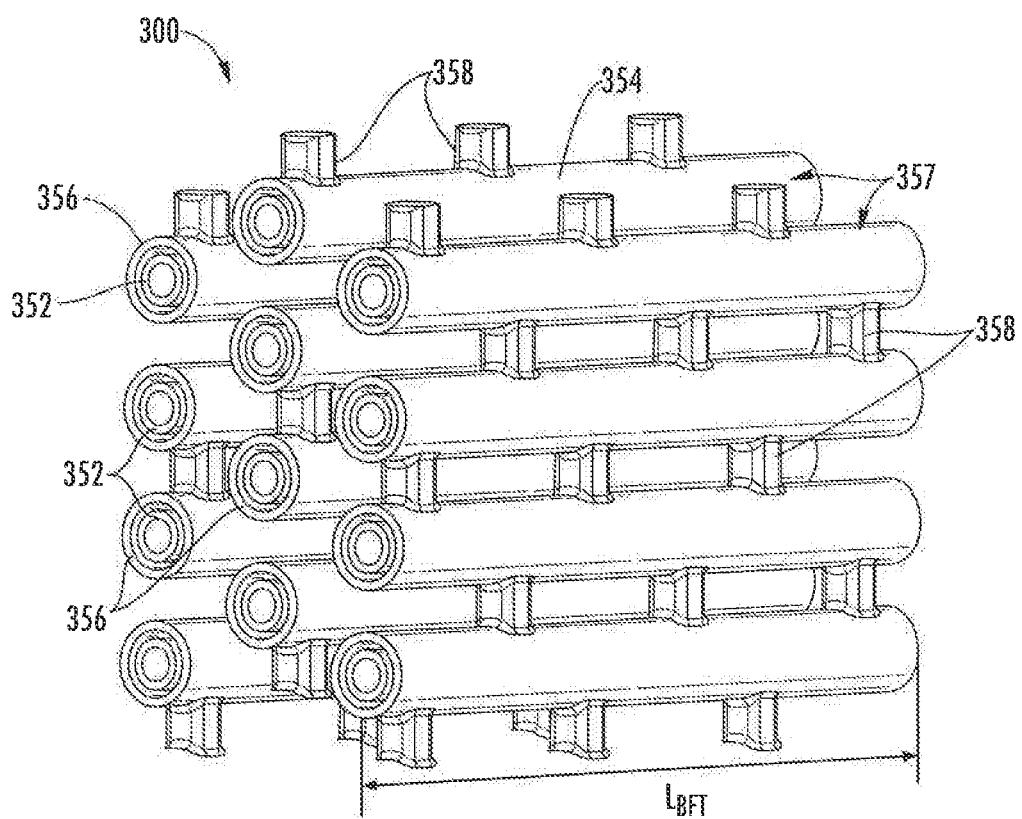
FIG. 7 is a side, perspective view and partial cross-sectional view of a heat exchanger in accordance with another exemplary embodiment of the present subject matter.

Referring now to FIG. 7, a cross-sectional view is provided of a heat exchanger 300 according to another exemplary embodiment of the present subject matter. Like the embodiment of FIG. 6, the exemplary heat exchanger 300 illustrated in FIG. 7 utilizes a flow of buffer fluid $F_B$ between a hot fluid $F_H$ and a cool fluid $F_C$ to facilitate the exchange of heat between the hot and cool fluids $F_H$, $F_C$ while also isolating the hot and cool fluids $F_H$, $F_C$ from one another. More particularly, in the exemplary embodiment of FIG. 7, the first chamber 302 of the heat exchanger 300 comprises a plurality of cool fluid tubes 352, through which the cool fluid $F_C$ flows, and the buffer fluid flowpath 306 comprises a plurality of buffer fluid tubes 356, through which the buffer fluid $F_B$ flows. Each cool fluid tube 352 of the plurality of cool fluid tubes 352 may be disposed within a respective one of the buffer fluid tubes 356 of the plurality of buffer fluid tubes 356 to form an array or bank 354 of nested tubes, which may be referred to herein as the nested tube bank 354. In some embodiments, each cool fluid tube 352 may be concentric with its respective buffer fluid tube 356.

In the exemplary embodiment of FIG. 7, the hot fluid $F_H$ flows around or against the nested tube bank 354 to transfer heat from the hot fluid $F_H$ to the buffer fluid $F_B$ and thereby to the cool fluid $F_C$. More particularly, each buffer fluid tube 356 of the plurality of buffer fluid tubes 356 may define an outer surface 357. The second chamber 304 of the heat exchanger 300 may surround the plurality of buffer fluid tubes 356 such that the hot fluid $F_H$ flows around and/or against the outer surface 357 of each buffer fluid tube 356 of the plurality of buffer fluid tubes 356.

Further, the buffer fluid flowpath 306 may be open along each buffer fluid tube 356, e.g., to balance any mal-distribution effects of the buffer fluid inlet 312. More particularly, the buffer fluid flowpath 306 may be generally annular along each buffer fluid tube 356. In some embodiments, each internal cool fluid tube 352 may be supported inside its respective buffer fluid tube 356 by an array of pins or the like (not shown), which also may serve as a fin/thermal via and/or mechanical stiffener. It will be appreciated that the pins may be configured such that the buffer fluid flowpath 306 remains open with respect to the axial flow direction along each tube 356. Moreover, the flow of buffer fluid $F_B$ may be initiated and/or terminated by plena above and/or below the heat exchanger 300.

As further illustrated in FIG. 7, the nested tube bank 354 comprises a plurality of ligaments 358 through which the buffer fluid $F_B$ flows. The ligaments 358 connect adjacent buffer fluid tubes 356 such that, globally, the buffer fluid flows mutually perpendicular to both the flow of hot fluid $F_H$ and the flow of cool fluid $F_C$ through the ligaments 358 connecting the nested tube bank 354. Locally, the flow of buffer fluid $F_B$ is con-current or co-current with the flow of hot fluid $F_H$ and the flow of cool fluid $F_C$. As shown in FIG. 7, a plurality of ligaments 358 may be defined along a length $L_{BFT}$ of each buffer fluid tube 356.

Turning now to FIGS. 8A through 8E, various exemplary embodiments of the buffer fluid tubes 356 will be described. As shown in the cross-sectional views of FIGS. 8A through 8E, the buffer fluid flowpath 306 may define a plurality of arcuate flow passages within the buffer fluid tubes 356 such that the buffer fluid flowpath 306 is discontinuous in a circumferential direction $C_T$ and defines a series of discrete parallel flow channels for the flow of the buffer fluid $F_B$. In exemplary embodiments, the buffer fluid tubes 356 of the nested tube bank 354 may comprise structurally compliant walls, e.g., for withstanding ultra large differential contraction strains, and such walls may define the arcuate flow passages for the flow of the buffer fluid $F_B$. More particularly, the thermal compliance in the buffer fluid $F_B$ may accommodate the thermal growth and relative movement of the hot and cool fluid $F_H$, $F_C$ conduits as they expand and contract over the operating conditions of the hot fluid $F_H$ and cool fluid $F_C$.

Figure 8A:
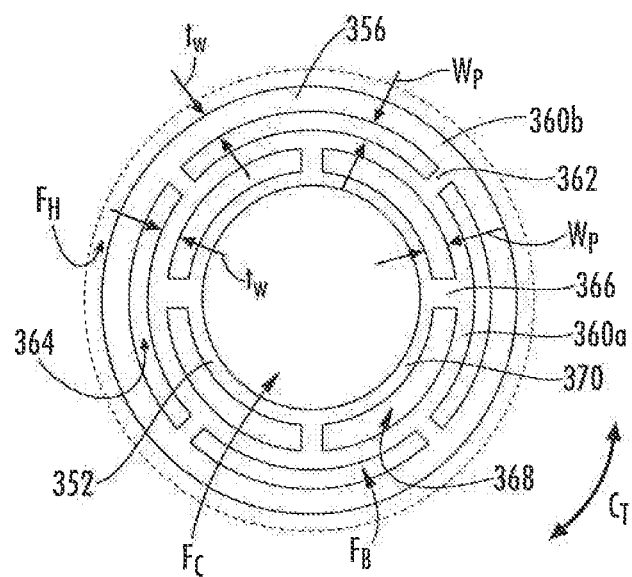
FIGS. 8A through 8E are cross-sectional views of a portion of the heat exchanger of FIG. 7 in accordance with various exemplary embodiments of the present subject matter.
Figure 8B:
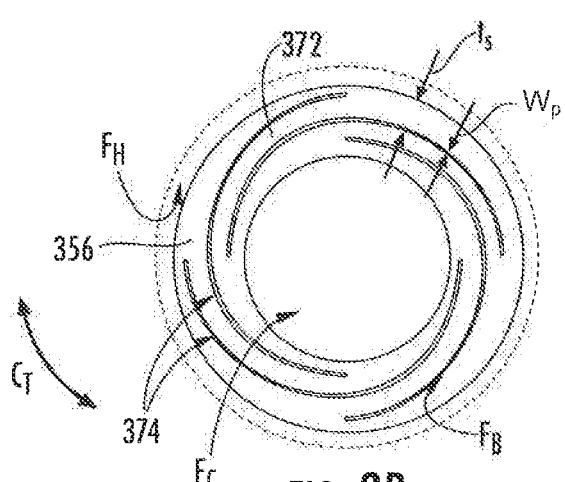
Figure 8C:
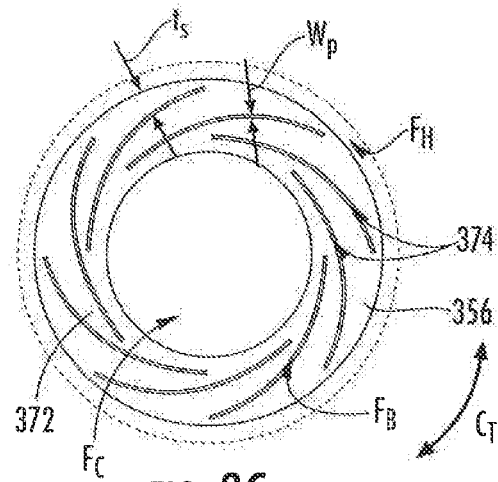

Referring particularly to FIG. 8A, each buffer fluid tube 356 of the plurality of buffer fluid tubes 356 may comprise at least two concentric walls 360 and a first plurality of radial segments 362 radially connecting the at least two concentric walls 360. More specifically, the first plurality of radial segments 362 may be circumferentially spaced apart from one another to define a first plurality of passages 364 through which the buffer fluid $F_B$ flows within the buffer fluid tubes 356. Further, a second plurality of radial segments 366 may radially connect an inner wall 360a of the at least two concentric walls 360 to a respective one cool fluid tube 352 of the plurality of cool fluid tubes 352. Like the first plurality of radial segments 362, the second plurality of radial segments 366 may be circumferentially spaced apart from one another to define a second plurality of passages 368 through which the buffer fluid $F_B$ flows within the buffer fluid tubes 356. In some embodiments, the walls 360 of the buffer fluid tube 356 and a wall 370 defining the cool fluid tube 352 may be relatively thin, e.g., each wall 360, 370 may have a thickness $t_w$ that is less than a width $w_p$ of the passages 364, 368. A relatively small diameter of the cool fluid tubes 352 and the buffer fluid tubes 356 in which the tubes 352 are disposed implies high mechanical strength, such that the walls 360, 370 may be thinner than would be required for larger diameter tubes. Moreover, the passages 364, 368 may have a width $w_p$ to provide sufficient flow area for the buffer fluid $F_B$ to flow therethrough, e.g., without requiring a large pump to drive the flow of buffer fluid $F_B$. Of course, it will be appreciated that the walls 360, 370 need not have the same thickness $t_w$ but may vary in thickness and the passages 364, 368 need not have the same width $w_p$ but may vary in width.

Referring now to FIGS. 8B through 8E, in other embodiments, each buffer fluid tube 356 of the plurality of buffer fluid tubes 356 may comprise a plurality of arcuate segments 372 that define the buffer fluid flowpath 306. As shown in FIGS. 8B through 8E, the plurality of arcuate segments 372 may be offset from one another to define a plurality of passages 374 through which the buffer fluid $F_B$ flows. Further, the arcuate segments 372 may have a thickness $t_s$, which may vary from one embodiment to another and/or from one segment 372 to another. For example, the arcuate segments 372 of FIGS. 8B and 8C have a greater thickness $t_s$ than the arcuate segments 372 of FIGS. 8D and 8E. As such, the width $w_p$ of the passages 374 may vary as the segment thickness $t_s$ varies, and the passage width $w_p$ may vary inversely to the segment thickness $t_s$. Moreover, the angle or orientation of the arcuate segments 372, e.g., with respect to an outer wall 360b of the buffer fluid tube 365 and/or the wall 370 defining the cool fluid tube 352, may vary from one embodiment to another and/or from one segment 372 to another. For instance, the arcuate segments 372 of FIG. 8D wrap around or follow the curve of the walls 360b, 370 more than the arcuate segments of FIG. 8E. As such, for the depicted embodiments, the passage width $w_p$ of the passages 374 in the embodiment of FIG. 8E varies more from the outer wall 360b to the cool fluid tube wall 370 than in the embodiment of FIG. 8D, with the passage width $w_p$ of the passages 374 in the embodiment of FIG. 8E being greater near the outer wall 360b than in the embodiment of FIG. 8D.

Figure 8D:
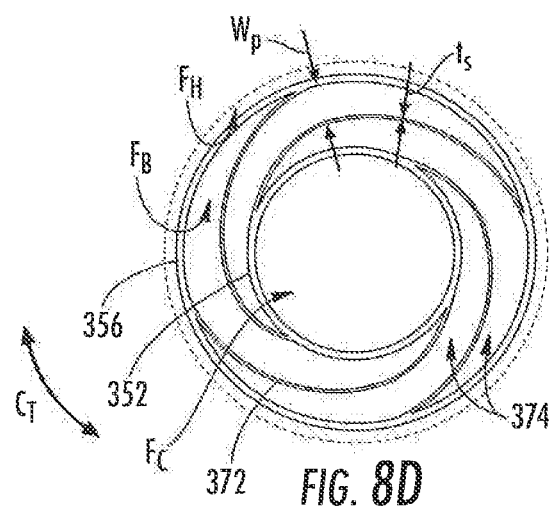
Figure 8E:
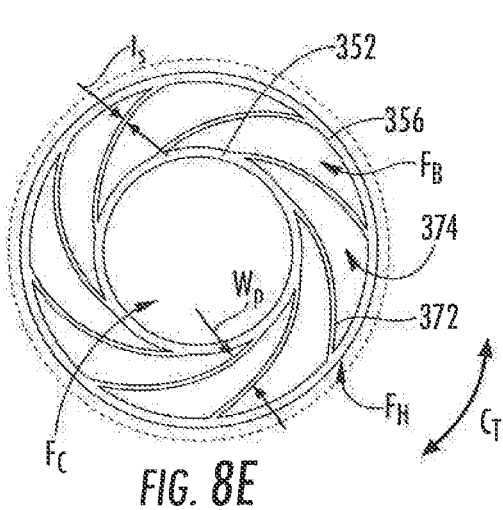

As previously described, the thermal compliance in the buffer fluid $F_B$ may accommodate the thermal growth and relative movement of, e.g., the second, hot fluid chamber 304 and the cool fluid tubes 352 as they expand and contract over the operating conditions of the hot fluid $F_H$ and cool fluid $F_C$. For example, as shown in FIG. 8D, the buffer fluid tubes 356 and arcuate segments 372 tie the cool fluid tubes 352 to the hot fluid chamber or conduit 304 and allow for thermal expansion. As illustrated, the segments 372 may be curved or comprise one or more bends like a spring to provide thermal compliance. Generally, the segments 372 may be thinner than the cool fluid tubes 352 and the buffer fluid tubes 356. In some embodiments, the segment thickness $t_s$ may be within a range of about 0.020 inches (in.) to about 0.200 in., and in particular embodiments, may be within a range of about 0.020 in. to about 0.075 in.

It will be appreciated that the buffer fluid tubes 356 illustrated in FIGS. 8A through 8E may utilize a crack impeding geometry, i.e., the configuration of the walls 360 and radial segments 362, 364 and/or the arcuate segments 372 helps stop the propagation of cracks that could lead to a breach of the buffer fluid layer and mixing of the hot fluid $F_H$ with the cool fluid $F_C$. For instance, referring to FIG. 8A, the offset radial segments 362, 364 between the inner wall 360a and outer wall 360b of the buffer fluid tube 256 help impede cracks, e.g., that may form at the outer wall 360b, thereby stopping such cracks propagating from the outer wall 360b through the inner wall 360a and to the cool fluid tube wall 370. Further, the various constructions of buffer fluid tubes 356 illustrated in FIGS. 8A through 8E may represent high reliability embodiments, requiring multiple wall failures within the same sector before mixing occurs between the hot fluid $F_H$ and the cool fluid $F_C$. Referring again to FIG. 8A, three wall failures—at the outer wall 360b, the inner wall 360a, and the cool fluid tube wall 370—must be located circumferentially within the same sector before the buffer fluid layer between the hot fluid $F_H$ and the cool fluid $F_C$ is completely compromised and mixing occurs between the hot fluid $F_H$ and the cool fluid $F_C$.

In some embodiments, the tube walls 360a, 360b, 370, radial segments 362, 366, and arcuate segments 372 may be formed using an additive-manufacturing process, such as a 3D printing process. For example, the buffer fluid tube walls 360, cool fluid tube wall 370, and the radial segments 362, 366 of the exemplary embodiment of FIG. 8A may be formed by an additive manufacturing process. By additively manufacturing the cool fluid and buffer fluid tubes 352, 356, as well as the ligaments 358 in embodiments including the ligaments 358, a desired geometry for the buffer fluid flowpath 306 may be achieved, e.g., without a relatively complicated manufacturing process and/or while allowing the tubes 352, 356 (and ligaments 358 in certain embodiments) to be formed as a single piece component. For instance, an additive manufacturing process may allow the tubes 352, 356 and ligaments 358 to be integrally formed and include a variety of features not possible when using prior manufacturing methods, e.g., the heat exchanger 300 may be fully integrated (as described herein), hermetically sealed, and/or may be formed without braze joints, which are potential locations of fluid leakage.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral subcomponents. Although additive manufacturing technology is described herein as enabling fabrication of complex objects by building objects point-by-point, layer-by-layer, typically in a vertical direction, other methods of fabrication are possible and within the scope of the present subject matter. For instance, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For instance, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

Moreover, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed that have different materials and material properties for meeting the demands of any particular application. Further, although additive manufacturing processes for forming the components described herein are described in detail, it should be appreciated that in alternate embodiments, all or a portion of these components may be formed via casting, machining, and/or any other suitable manufacturing process. Indeed, any suitable combination of materials and manufacturing methods may be used to form these components.

Figure 9:
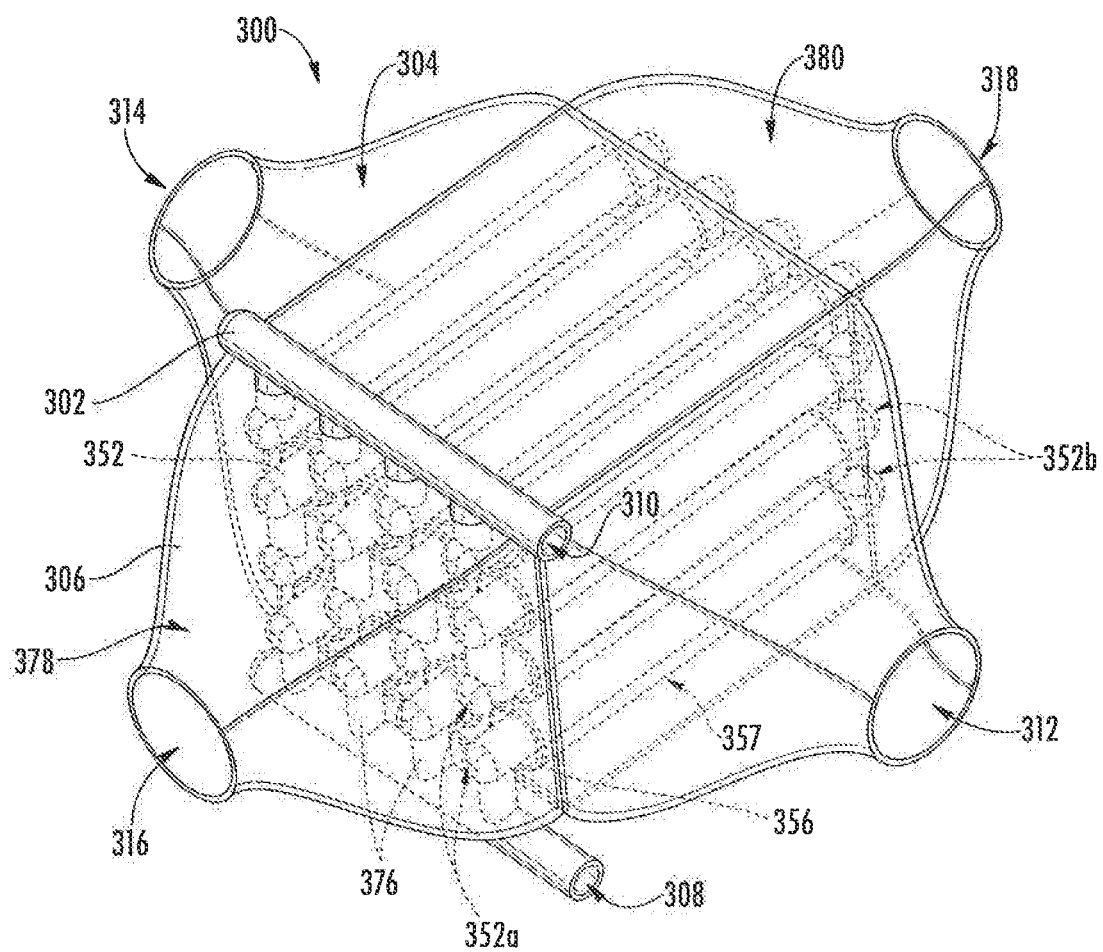
FIG. 9 is a partially translucent, perspective view of the heat exchanger of FIG. 7 in accordance with an exemplary embodiment of the present subject matter.

Turning now to FIG. 9, a perspective view is provided of the heat exchanger 300 of FIG. 7, according to an exemplary embodiment of the present subject matter. As shown in FIG. 9, the cool fluid $F_C$ may flow into the first chamber 302, i.e., the cool fluid tubes 352, via the first inlet 308 and may exit the first chamber 302 via the first outlet 310. The cool fluid tubes 352 may be joined at alternating ends to form a flowpath from the first inlet 308 to the first outlet 310. More particularly, each cool fluid tube 352 of the plurality of cool fluid tubes 352 comprises a first end 352a and a second end 352b. As shown in FIG. 9, the cool fluid tubes 352 may be arranged in groups such that each cool fluid tube 352 within a group of the cool fluid tubes 352 is laterally adjacent to another cool fluid tube 352 within the group and one group of cool fluid tubes 352 is vertically adjacent to another group of cool fluid tubes 352. The depicted exemplary embodiment of FIG. 9 comprises four groups of cool fluid tubes 352, and each group comprises four cool fluid tubes 352. From the first inlet 308, the cool fluid $F_C$ may flow into each tube 352 of the first group of cool fluid tubes 352, located nearest the first inlet 308, at the first end 352a of each tube 352 in the first group. Then, the cool fluid $F_C$ may flow from the second end 352b of each tube 352 in the first group through a cool fluid tube connector 376 into the second end 352b of each tube 352 in a second group of cool fluid tubes 352, which is disposed vertically above the first group. Next, the cool fluid $F_C$ may flow from the first end 352a of each tube 352 in the second group through a cool fluid tube connector 376 into the first end 352a of each tube 352 in a third group of cool fluid tubes 352, which is disposed vertically above the second group. The cool fluid $F_C$ may flow from the second end 352b of each tube 352 in the third group through a cool fluid tube connector 376 into the second end 352b of each tube 352 in a fourth group of cool fluid tubes 352, which is disposed vertically above the third group. Finally, for the depicted heat exchanger 300, the cool fluid $F_C$ may flow from the first end 352a of each tube 352 in the fourth group through a cool fluid tube connector 376 into a cool fluid tube 352 defining the first outlet 310 and egress the heat exchanger 300 through the first outlet 310. Of course, other configurations of the plurality of cool fluid tubes 352 may be used as well, such that the cool fluid $F_C$ circulates through the plurality of cool fluid tubes 352 in other ways.

It will be appreciated that the heat exchanger 300 as illustrated in FIGS. 7 and 9 may define a fully integrated cross-flow network that enables thermal performance optimization of the heat exchanger 300. More particularly, the cool fluid $F_C$ flows in opposite directions in adjacent groups, as described above with respect to the flow of the cool fluid $F_C$ from the first inlet 308 to the first outlet 310. Further, the heat exchanger of FIGS. 7 and 9, which may have buffer fluid tube 356 cross-sections as illustrated in FIGS. 8A-8E, provides substantially constant contact between the buffer fluid $F_B$ and the hot fluid $F_H$ and the buffer fluid $F_B$ and the cool fluid $F_C$. That is, unlike the embodiment of FIG. 6, where the buffer fluid $F_B$ flows in the first segment 324 that surrounds the first, cool fluid chamber 302 and the second segment 326 that surrounds the second, hot fluid chamber 304, in the embodiment of FIGS. 7 and 9, the buffer fluid $F_B$ is simultaneously in contact with both the hot fluid $F_H$ and the cool fluid $F_C$, as the cool fluid $F_C$ flows within tubes 352 disposed within the buffer fluid flowpath 306 and the hot fluid $F_H$ flows around the buffer fluid flowpath 306.

Keeping with FIG. 9, the second chamber 304 includes the second inlet 312, through which the hot fluid $F_H$ flows into the heat exchanger 300, and the second outlet 314, through which the hot fluid $F_H$ flows out of the heat exchanger 300. As previously described, for the heat exchanger 300 shown in FIGS. 7 and 9, the second chamber 304 surrounds the plurality of buffer fluid tubes 356, in which the cool fluid tubes 352 are disposed, such that the hot fluid $F_H$ flows around and/or against the buffer fluid tubes 356. As further illustrated in FIG. 9, the buffer fluid flowpath 306 includes the buffer fluid inlet 316, through which the buffer fluid $F_B$ flows into the heat exchanger 300, and the buffer fluid outlet 318, through which the buffer fluid $F_B$ exits the heat exchanger 300. In the embodiment depicted in FIG. 9, each buffer fluid tube 356 of the plurality of buffer fluid tubes 356 is open to an inlet portion 378 of the buffer fluid flowpath 306 and an outlet portion 380 of the buffer fluid flowpath 306. Such a configuration, e.g., may help achieve an adequate flow of the buffer fluid $F_B$ even when, in some embodiments, the buffer fluid tubes 356 comprise relatively thin arcuate passages 364, 366, 374 as described with respect to FIGS. 8A through 8E.

Figure 10:
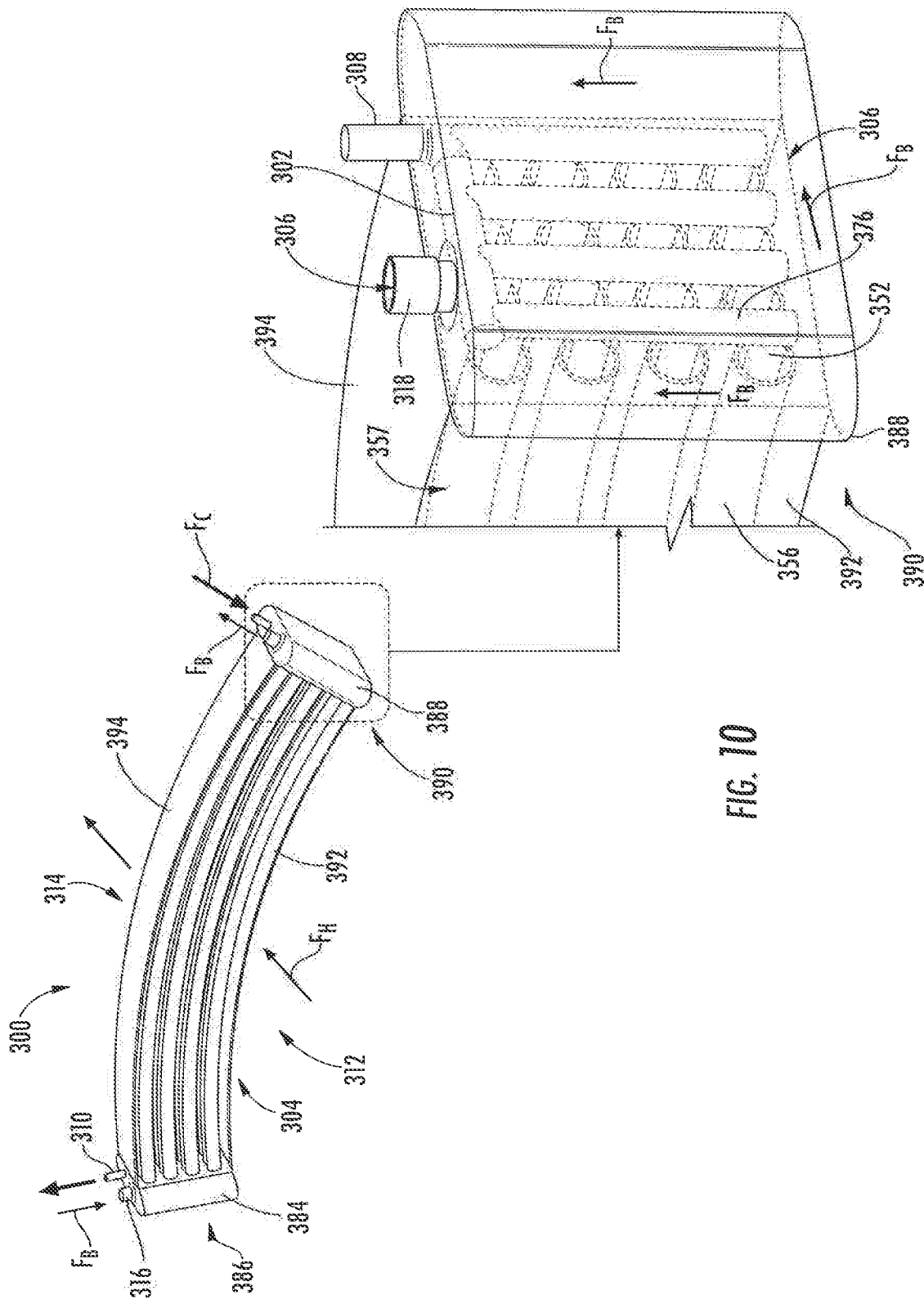
FIG. 10 is a side, perspective view and an enlarged partially translucent end view of a heat exchanger in accordance with another exemplary embodiment of the present subject matter.

Referring now to FIG. 10, exemplary embodiments of the heat exchanger 300 implemented in a duct will be described. As previously described, a heat exchanger and/or heat exchanger system, such as the heat exchanger 300 and system 30, of the present subject matter may have various applications. In some embodiments, the heat exchanger 300 and/or system 30 may be disposed outside or external to a hypersonic propulsion engine (such as engine 200) and may be used to cool bleed air from the engine, which cooled bleed air may then be used for various thermal management functions. In such embodiments, the heat exchanger 300 and/or system 30 may be packaged in various configurations, e.g., as described with respect to FIGS. 4 through 9. In other embodiments, the heat exchanger 300 may be configured to reside in a duct, such as the inlet 208 of the engine ducting assembly 204 of the hypersonic engine 200, e.g., such that the heat exchanger 300 may be used to cool air flowing into the engine and thereby cool the total engine flowpath. As another example, the heat exchanger 300 may be configured to be integrated into a propulsion duct, a bypass duct, and/or a bleed air duct of a hypersonic propulsion engine, such as the engine 200 described herein. In any of these embodiments, as illustrated and described herein, the heat exchanger 300 may be configured such that the buffer fluid $F_B$ at a given location is in simultaneous thermal contact with both the hot fluid $F_H$ and the cool fluid $F_C$. That is, the buffer fluid $F_B$ may not simultaneously be in thermal contact with both the hot fluid $F_H$ and the cool fluid $F_C$ at every location within the heat exchanger 300, but in exemplary embodiments, the buffer fluid $F_B$ is in simultaneous thermal contact with both the hot fluid $F_H$ and the cool fluid $F_C$ in at least one location within the heat exchanger 300.

It will be appreciated that the heat exchanger 300 shown in FIG. 10 generally is configured as described with respect to FIGS. 7 through 9. For instance, the heat exchanger 300 illustrated in FIG. 10 comprises a plurality of cool fluid tubes 352 and a plurality of buffer fluid tubes 356, with a cool fluid tube 352 disposed within each buffer fluid tube 356. Each cool fluid tube 352 may be concentric with the respective buffer fluid tube 356 in which the cool fluid tube 352 is disposed. The cool fluid $F_C$ flows within the cool fluid tubes 352, which define the first chamber 302, and the buffer fluid $F_B$ flows within the buffer fluid tubes 356, which define the buffer fluid flowpath 306. The hot fluid $F_H$ flows against or around the outer surface 357 of the buffer fluid tubes 357.

Unlike the embodiments of FIGS. 7 and 9, the embodiment of the heat exchanger 300 depicted in FIG. 10 has an arcuate shape. More particularly, the illustrated heat exchanger 300 comprises a first manifold 384 at a first end 386 and a second manifold 388 at a second end 390, and the nested tube bank 354 (i.e., the buffer fluid tubes 356 with the cool fluid tubes 352 disposed therein) arcs from the first manifold 384 to the second manifold 388. It will be appreciated that the arcuate shape of the heat exchanger 300 depicted in FIG. 10 may allow the heat exchanger 300 to be disposed in or integrated with a duct having a generally circular or annular shape, such as an engine inlet, a propulsion duct, a bypass duct, a bleed air duct, etc. As illustrated in FIG. 10, the heat exchanger 300 may comprise an inner wall 392 and an outer wall 394, which may be the inner and outer walls of an annular duct in which the heat exchanger 300 is disposed. The nested tube bank 354 is disposed between the inner wall 392 and the outer wall 394, and the inner wall 392 and outer wall 394 may provide an inner and outer boundary for the flow of the hot fluid $F_H$.

As further shown in FIG. 10, the buffer fluid $F_B$ is discharged into each of the first manifold 384 and second manifold 388. As such, the buffer fluid $F_B$ may surround the network of cool fluid tubes 352 and provide continual isolation between the cool fluid $F_C$ and the hot fluid $F_H$, e.g., between cold fuel and hot bleed air in some applications of the heat exchanger 300. As described elsewhere herein, in other embodiments, the buffer fluid $F_B$ may be selectively used as an intermediate layer between the cool and hot fluids $F_C$, $F_H$. For example, the buffer fluid flowpath 306 may be configured such that the buffer fluid $F_B$ flows substantially only within the first manifold 384 and the second manifold 388 (e.g., to protect the joints of the network of cool fluid tubes 352) and the hot fluid $F_H$ flows directly over the cool fluid tubes 352 between the inner wall 392 and the outer wall 394 such that the cool fluid $F_C$ and the hot fluid $F_H$ may directly transfer heat therebetween.

Figure 11:
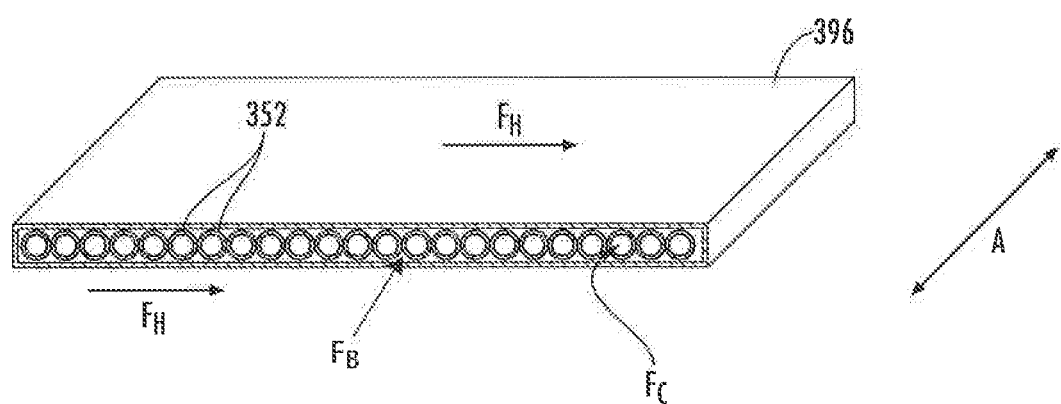
FIG. 11 is a schematic view of a heat exchanger in accordance with still another exemplary embodiment of the present subject matter.

Turning now to FIG. 11, a schematic view is provided of another exemplary embodiment of the heat exchanger 300. As shown in FIG. 11, in some embodiments, the annularly nested cool fluid tubes 352 and buffer fluid tubes 356 may be merged into a single sheet in the axial direction A to form discrete cool fluid tubes 352 inside a buffer fluid plenum 396. The cool fluid $F_C$ may flow through the cool fluid tubes 352 as described, and the buffer fluid plenum 396 defines the buffer fluid flowpath 306 for the flow of the buffer fluid $F_B$ therethrough; thus, similar to the embodiments of FIGS. 7 through 10, the buffer fluid flowpath 306 surrounds the cool fluid tubes 352. The hot fluid $F_H$ may flow over or around the buffer fluid plenum 396 to facilitate heat exchange between the hot fluid $F_H$ and the cool fluid $F_C$ through the buffer fluid $F_B$.

As described herein with respect to FIGS. 4 through 11, the buffer fluid $F_B$ actively circulates through the heat exchanger 300. In some embodiments, the heat exchanger system 30 may comprise a recirculation pump 382 (FIGS. 4, 5) to pump the buffer fluid $F_B$ and thereby establish circulation of the buffer fluid $F_B$ through the buffer fluid flowpath 306. In other embodiments, circulation of the buffer fluid $F_B$ through the buffer fluid flowpath 306 may be established by natural convection. More particularly, under natural convection, the flow of the buffer fluid $F_B$ is not generated by any external source (e.g., a pump, fan, suction device, etc.) but by density differences in the buffer fluid $F_B$ due to temperature gradients. For example, the heating of the buffer fluid $F_B$ by the hot fluid $F_H$ and the cooling of the buffer fluid $F_B$ by the cold fluid $F_C$ induces a natural circulation flow.

The buffer fluid $F_B$ used in the heat exchanger 300 may depend on the cool fluid $F_C$ and the hot fluid $F_H$ flowing through the heat exchanger 300. Generally, the buffer fluid $F_B$ may be a relatively higher conductivity fluid to enable an additional layer of redundancy (dual redundancy) in the heat exchanger 300. For embodiments in which the cool fluid $F_C$ is fuel of a hypersonic propulsion engine (such as engine 200) and the hot fluid $F_H$ is bleed air of a hypersonic propulsion engine (such as engine 200), example buffer fluids $F_B$ may include, but are not limited to, the following: thermal oils; supercritical fluids such as supercritical carbon dioxide (sCO$_2$); liquid metals; standard industry refrigerants (R-### ANSI/ASHRAE designation), e.g., R-410a; and noble gases or mixtures of noble gases, which also carry refrigerant designations. As an example, where the cool fluid $F_C$ is liquid hydrogen fuel (LH2 or the refrigerant designation R-702), the buffer fluid $F_B$ may be helium (R-704) or neon (R-720) and, more particularly, may be supercritical helium, subcooled liquid neon, transcritical neon, or supercritical neon. As another example, where the cool fluid $F_C$ is methane (R-50), the buffer fluid $F_B$ may be nitrogen (R-728), argon (R-740), or krypton (R-784). More particularly, the buffer fluid $F_B$ may be transcritical or supercritical nitrogen, transcritical or supercritical argon, or subcooled liquid krypton, transcritical krypton, or supercritical krypton. As yet another example, where the cool fluid $F_C$ is jet fuel or jet propellant (JP), the buffer fluid $F_B$ may be pentafluoroethane (R-410a) fire extinguishing media, a near azeotropic mixture of difluoromethane (R-32) and pentafluoroethane (R-125), carbon dioxide (CO$_2$ or R-744), or a binary gas compound, such as xenon plus another gas. More particularly, the buffer fluid $F_B$ may be supercritical pentafluoroethane or supercritical carbon dioxide (sCO$_2$). Further, a fire-suppressing buffer fluid $F_B$, such as supercritical carbon dioxide, may be selected for fuel inserting or for otherwise suppressing a fire in the event of a leak or other failure in which the hot and cool fluids $F_H$, $F_C$ could come into contact or mix together. Other buffer fluids, particularly where the heat exchanger 300 is used in non-hypersonic propulsion engine applications, may be used as well.

Additionally, in some embodiments of the heat exchanger 300, the buffer fluid $F_B$, i.e., the intermediate layer between the hot fluid $F_H$ and the cool fluid $F_C$, may be monitored. More particularly, one or more sensors or the like may be positioned to monitor the buffer fluid $F_B$, e.g., for heat exchanger fault detection. As an example, the heat exchanger 300 may incorporate pressure-based leak monitoring by monitoring the pressure of the buffer fluid $F_B$.

Moreover, in some embodiments of the heat exchanger 300, the buffer fluid $F_B$ may be selectively utilized as a buffer or intermediate layer between the cool fluid $F_C$ and the hot fluid $F_H$. More specifically, in one or more locations within the heat exchanger 300, the cool fluid $F_C$ and the hot fluid $F_H$ may engage in direct heat exchange. For example, a flowpath for the cool fluid $F_C$ may be disposed against a flowpath for the hot fluid $F_H$ within the buffer fluid flowpath 306 disposed between the cool fluid flowpath and the hot fluid flowpath. Thus, in some embodiments, the buffer fluid $F_B$ may be used at discrete and select locations within the heat exchanger 300 rather than separating the cool and hot fluids $F_C$, $F_H$ throughout the heat exchanger 300. As an example, high-strength drawn tubing (e.g., produced by conventional manufacturing techniques) may be used to construct a direct fuel-air (cool fluid-hot fluid) heat exchanger 300, and the buffer fluid $F_B$ may be used to protect one or more joints where the tubing interfaces with the fuel and air chambers or manifolds 302, 304.

It will be appreciated that, although described with respect to the hypersonic vehicle 100 and hypersonic propulsion engine 200, the heat exchanger 300 described herein may have other applications. That is, the heat exchanger 300 and heat exchanger system 30 is not limited to use with a hypersonic propulsion engine or a hypersonic vehicle. As an example, the heat exchanger 300 and heat exchanger system 30 generally may be utilized with a volatile fluid used to cool hot air where safety and/or redundancy of the heat exchanger and/or heat exchanger system are required.

Accordingly, the present subject matter provides heat exchanger systems and heat exchangers, such as a fuel-cooled air cooler. An exemplary fuel-cooled air cooler heat exchanger described herein may enable hypersonic flight and hypersonic propulsion engine operation, where the stagnation temperature limits air heat sink. More particularly, the heat exchanger described herein utilizes an actively circulating buffer fluid to facilitate heat exchange between a hot fluid and a cool fluid while maintaining fluidic isolation. The buffer fluid may be actively driven through forced or natural circulation. Such a heat exchanger may allow for cooling bleed air from a hypersonic propulsion engine with fuel used by the hypersonic propulsion engine for combustion. More particularly, as described herein, the buffer fluid flow loop of the heat exchanger provides redundant fluidic isolation, e.g., at least two failed walls before air-fuel (hot fluid-cool fluid) mixing. Some embodiments of the heat exchanger described herein, such as the circumferentially separated arcuate buffer fluid passages disposed between the air and the fuel, assure three failed walls before air-fuel mixing, without a substantial increase in thermal resistance. Further, the buffer fluid may be selected to further reduce the risk of heat-sinking to fuel (i.e., the cool fluid), e.g., an inflammable refrigerant (such as fire suppressant FE241 or CO$_2$) may be selected as the buffer fluid. In some embodiments, both the cool fluid and the hot fluid may be volatile fluids and at least some embodiments of the heat exchanger described herein would encase both volatile fluids in the buffer fluid, with double or dual redundancy. Moreover, as described herein, the heat exchanger may incorporate a buffer fluid recuperation scheme that aids in thermal strain management, e.g., for high differential temperature applications. Additionally or alternatively, the heat exchanger may comprise nested tubes with structurally compliant walls, which may help the heat exchanger withstand ultra large temperature differential contraction strains. The heat exchanger also may be additively manufactured, e.g., the nested tube embodiments may comprise additively manufactured tube walls forming a fully integrated component that may be hermetically sealed without the use of braze joints. Further, by actively driving the buffer fluid through the heat exchanger, e.g., through forced or natural flow, the buffer fluid may provide thermal capacity control, for example, driving component thermal time constant and accommodating different rate transients from either the hot or cool fluid stream. Moreover, an actively driven buffer fluid may provide at least partial regenerator functionality of the buffer fluid, which may help in managing mechanical loads due to the temperature differential between the hot and cool fluids.

Further aspects of the invention are provided by the subject matter of the following clauses:

1. A heat exchanger comprising a first chamber for receipt of a flow of cool fluid, the first chamber defining a first inlet for an ingress of the cool fluid into the first chamber and a first outlet for an egress of the cool fluid from the first chamber; a second chamber for receipt of a flow of hot fluid, the second chamber defining a second inlet for an ingress of the hot fluid into the second chamber and a second outlet for an egress of the hot fluid from the second chamber; and a buffer fluid flowpath for circulation of a buffer fluid therethrough, the buffer fluid flowpath comprising a buffer fluid inlet for an ingress of the buffer fluid and a buffer fluid outlet for an egress of the buffer fluid, the buffer fluid flowpath disposed between the first chamber and the second chamber, wherein the buffer fluid circulates within the buffer fluid flowpath disposed between the first chamber and the second chamber to transfer heat from the hot fluid to the cool fluid.

2. The heat exchanger of any preceding clause, wherein a recirculation pump pumps the buffer fluid to establish circulation of the buffer fluid through the buffer fluid flowpath.

3. The heat exchanger of any preceding clause, wherein circulation of the buffer fluid through the buffer fluid flowpath is established by natural convection.

4. The heat exchanger of any preceding clause, further comprising an outer wall surrounding each of the first chamber, the second chamber, and the buffer fluid flowpath, wherein the first chamber comprises a first wall, the second chamber comprises a second wall, and the buffer fluid flowpath comprises a third wall, and wherein the cool fluid is separated from the hot fluid by the first wall, the second wall, and the third wall.

5. The heat exchanger of any preceding clause, wherein the buffer fluid flowpath comprises a first segment surrounding the first chamber and a second segment surrounding the second chamber.

6. The heat exchanger of any preceding clause, wherein the buffer fluid flowpath comprises a cross-flow tube and wherein the cross-flow tube extends from the first segment to the second segment.

7. The heat exchanger of any preceding clause, wherein the cross-flow tube is oriented perpendicular to the first chamber and the second chamber and wherein a flow of the buffer fluid in the cross-tube is perpendicular to both the flow of cool fluid and flow of hot fluid.

8. The heat exchanger of any preceding clause, wherein the cross-flow tube includes internal fins.

9. The heat exchanger of any preceding clause, wherein the cross-flow tube includes internal flow rate-metering.

10. The heat exchanger of any preceding clause, wherein the cross-flow tube includes turbulating or mixing features.

11. The heat exchanger of any preceding clause, wherein the cross-flow tube includes boundary layer restarting features.

12. The heat exchanger of any preceding clause, wherein the buffer fluid flowpath comprises four cross-flow tubes.

13. The heat exchanger of any preceding clause, wherein the cross-flow tubes are a coated tube array and wherein the coating is selected based on the buffer fluid.

14. The heat exchanger of any preceding clause, wherein the cross-flow tubes are an uncoated tube array.

15. The heat exchanger of any preceding clause, wherein the cross-flow tubes vary in diameter or width.

16. The heat exchanger of any preceding clause, wherein the cross-flow tubes decrease in diameter from the cross-flow tube nearest the first inlet and the second inlet to the cross-flow tube nearest the first outlet and the second outlet.

17. The heat exchanger of any preceding clause, wherein at least two cross-flow tubes have the same diameter or width.

18. The heat exchanger of any preceding clause, wherein the diameter or width of at least one cross-flow tube varies along a length of the cross-flow tube.

19. The heat exchanger of any preceding clause, wherein the diameter or width of the at least one cross-flow tube continuously tapers from one end to an opposite end.

20. The heat exchanger of any preceding clause, wherein the at least one cross-flow tube includes step changes in its diameter or width along a length of the at least one cross-flow tube.

21. The heat exchanger of any preceding clause, wherein at least one cross-flow tube includes an external baffle array with a variable flow area within at least one of the first chamber and the second chamber.

22. The heat exchanger of any preceding clause, wherein the variable flow area is disposed in the first chamber and is contracting along a direction of the flow of the cool fluid.

23. The heat exchanger of any preceding clause, wherein the variable flow area is disposed in the first chamber and is expanding along a direction of the flow of the cool fluid.

24. The heat exchanger of any preceding clause, wherein the variable flow area is disposed in the second chamber and is contracting along a direction of the flow of the hot fluid.

25. The heat exchanger of any preceding clause, wherein the variable flow area is disposed in the second chamber and is expanding along a direction of the flow of the hot fluid.

26. The heat exchanger of any preceding clause, wherein at least one cross-flow tube includes an external fin array.

27. The heat exchanger of any preceding clause, wherein fins of the external fin array have a graded geometry.

28. The heat exchanger of any preceding clause, wherein fins of the external fin array have a uniform geometry.

29. The heat exchanger of any preceding clause, wherein fins of the external fin array have a tapered geometry.

30. The heat exchanger of any preceding clause, wherein fins of the external fin array have a variable pitch geometry.

31. The heat exchanger of any preceding clause, wherein the buffer fluid flowpath comprises a first segment surrounding the first chamber and a second segment surrounding the second chamber, the first segment in thermal communication with the second segment along a length.

32. The heat exchanger of any preceding clause, wherein the buffer fluid circulates in a first direction in the first segment and in a second direction in the second segment, the first direction different from the second direction such that a counter-flow or cross-flow of the buffer fluid is established along the length.

33. The heat exchanger of any preceding clause, wherein the first segment is disposed adjacent the second segment to define a heat exchanger assembly having an outer surface.

34. The heat exchanger of any preceding clause, wherein a thermal insulation surrounds the outer surface.

35. The heat exchanger of any preceding clause, wherein the thermal insulation is applied around an intake side of the cool fluid near the first inlet.

36. The heat exchanger of any preceding clause, wherein the thermal insulation is applied around an intake side of the hot fluid near the second inlet.

37. The heat exchanger of any preceding clause, wherein the thermal insulation is a vacuum insulation with a vapor-cooled heat shield.

38. The heat exchanger of any preceding clause, wherein the thermal insulation is a vacuum insulation with a multi-layer insulation blanket.

39. The heat exchanger of any preceding clause, wherein the thermal insulation is double-aluminized dimpled Mylar®.

40. The heat exchanger of any preceding clause, wherein the thermal insulation is double-aluminized Mylar® with a fabric spacer.

41. The heat exchanger of any preceding clause, wherein the thermal insulation is double-aluminized dimpled biaxially-oriented polyethylene terephthalate.

42. The heat exchanger of any preceding clause, wherein the thermal insulation is double-aluminized biaxially-oriented polyethylene terephthalate with a fabric spacer.

43. The heat exchanger of any preceding clause, wherein the thermal insulation is double-goldized dimpled Mylar®.

44. The heat exchanger of any preceding clause, wherein the thermal insulation is double-goldized Mylar® with a fabric spacer.

45. The heat exchanger of any preceding clause, wherein the thermal insulation is double-goldized dimpled biaxially-oriented polyethylene terephthalate.

46. The heat exchanger of any preceding clause, wherein the thermal insulation is double-goldized biaxially-oriented polyethylene terephthalate with a fabric spacer.

47. The heat exchanger of any preceding clause, wherein the thermal insulation is a vacuum-panel insulation.

48. The heat exchanger of any preceding clause, wherein the thermal insulation is a foam with a vapor barrier.

49. The heat exchanger of any preceding clause, wherein the thermal insulation is an evacuated powder.

50. The heat exchanger of any preceding clause, wherein the thermal insulation is diatomaceous earth.

51. The heat exchanger of any preceding clause, wherein the thermal insulation is a silica aerogel.

52. The heat exchanger of any preceding clause, wherein the thermal insulation is silica.

53. The heat exchanger of any preceding clause, wherein the thermal insulation is silica encapsulated in a metal lining.

54. The heat exchanger of any preceding clause, wherein the thermal insulation is silica encapsulated in fiber.

55. The heat exchanger of any preceding clause, wherein the thermal insulation is silica encapsulated in a cloth blank.

56. The heat exchanger of any preceding clause, wherein the thermal insulation is glass fiber.

57. The heat exchanger of any preceding clause, wherein the thermal insulation is glass fiber encapsulated in a metal lining.

58. The heat exchanger of any preceding clause, wherein the thermal insulation is glass fiber encapsulated in fiber.

59. The heat exchanger of any preceding clause, wherein the thermal insulation is glass fiber encapsulated in a cloth blank.

60. The heat exchanger of any preceding clause, wherein the thermal insulation is a micropore ceramic system.

61. The heat exchanger of any preceding clause, wherein the thermal insulation is a micropore ceramic system encapsulated in a metal lining.

62. The heat exchanger of any preceding clause, wherein the thermal insulation is a micropore ceramic system encapsulated in fiber.

63. The heat exchanger of any preceding clause, wherein the thermal insulation is a micropore ceramic system encapsulated in a cloth blank.

64. The heat exchanger of any preceding clause, wherein the thermal insulation is a fiber blanket.

65. The heat exchanger of any preceding clause, wherein an outer wall defines the outer surface and wherein the first chamber, the second chamber, and the buffer fluid flowpath are each disposed within a volume defined by the outer wall.

66. The heat exchanger of any preceding clause, wherein the first chamber comprises a plurality of cool fluid tubes, and wherein the buffer fluid flowpath surrounds each cool fluid tube of the plurality of cool fluid tubes.

67. The heat exchanger of any preceding clause, wherein the buffer fluid flowpath defines an outer surface, and wherein the second chamber surrounds the buffer fluid flowpath such that the hot fluid flows against the outer surface of the buffer fluid flowpath.

68. The heat exchanger of any preceding clause, wherein the buffer fluid flowpath comprises a plurality of buffer fluid tubes and each cool fluid tube of the plurality of cool fluid tubes is disposed within a respective one of the buffer fluid tubes of the plurality of buffer fluid tubes, and wherein each buffer fluid tube of the plurality of buffer fluid tubes comprises at least two concentric walls and a first plurality of radial segments radially connecting the at least two concentric walls, the first plurality of radial segments circumferentially spaced apart from one another to define a plurality of passages through which the buffer fluid flows.

69. The heat exchanger of any preceding clause, further comprising a second plurality of radial segments radially connecting an inner wall of the at least two concentric walls to a respective one cool fluid tube of the plurality of cool fluid tubes, the second plurality of radial segments circumferentially spaced apart from one another.

70. The heat exchanger of any preceding clause, wherein the buffer fluid flowpath comprises a plurality of buffer fluid tubes and each cool fluid tube of the plurality of cool fluid tubes is disposed within a respective one of the buffer fluid tubes of the plurality of buffer fluid tubes, wherein each buffer fluid tube of the plurality of buffer fluid tubes comprises a plurality of arcuate segments defining the buffer fluid flowpath, and wherein the plurality of arcuate segments are offset from one another to define a plurality of passages through which the buffer fluid flows.

71. The heat exchanger of any preceding clause, wherein the cool fluid is a fuel of a hypersonic propulsion engine, and wherein the hot fluid is air flowing to the hypersonic propulsion engine during hypersonic flight operation of the hypersonic propulsion engine.

72. The heat exchanger of any preceding clause, further comprising a vane array positioned in a fuel inlet header volume of the first chamber.

73. The heat exchanger of any preceding clause, wherein the fuel inlet header volume is disposed adjacent the first inlet of the first chamber.

74. The heat exchanger of any preceding clause, further comprising a vane array positioned in an air inlet flow diffuser volume of the second chamber.

75. The heat exchanger of any preceding clause, wherein the air inlet flow diffuser volume is disposed adjacent the second inlet of the second chamber.

76. The heat exchanger of any preceding clause, wherein the first chamber comprises internal fins to aid in the exchange of heat between the cool fluid and the buffer fluid.

77. The heat exchanger of any preceding clause, wherein the first chamber comprises a first wall, the second chamber comprises a second wall, and the buffer fluid flowpath comprises a third wall, and wherein the internal fins project from the third wall into the first chamber.

78. The heat exchanger of any preceding clause, wherein the second chamber comprises internal fins to aid in the exchange of heat between the hot fluid and the buffer fluid.

79. The heat exchanger of any preceding clause, wherein the first chamber comprises a first wall, the second chamber comprises a second wall, and the buffer fluid flowpath comprises a third wall, and wherein the internal fins project from the third wall into the second chamber.

80. The heat exchanger of any preceding clause, wherein the heat exchanger is a component of a heat exchanger system, the heat exchanger system further comprising a buffer fluid heat exchanger, the buffer fluid flowpath passing through the buffer fluid heat exchanger.

81. The heat exchanger of any preceding clause, wherein the heat exchanger system further comprises a buffer fluid recuperator, wherein the buffer fluid flowpath passes through both the buffer fluid recuperator and the buffer fluid heat exchanger.

82. A heat exchanger system for a hypersonic propulsion engine comprising a first chamber for receipt of a flow of fuel, the first chamber defining a first inlet for an ingress of the fuel into the first chamber and a first outlet for an egress of the fuel from the first chamber; a second chamber for receipt of a flow of bleed air, the second chamber defining a second inlet for an ingress of the bleed air into the second chamber and a second outlet for an egress of the bleed air from the second chamber; and a buffer fluid flowpath for circulation of a buffer fluid therethrough, the buffer fluid flowpath comprising a buffer fluid inlet for an ingress of the buffer fluid and a buffer fluid outlet for an egress of the buffer fluid, wherein a first wall separates the first chamber from the buffer fluid flowpath and a second wall separates the second chamber from the buffer fluid flowpath, and wherein the first wall is adjacent the second wall and the first wall and the second wall define at least a portion of the buffer fluid flowpath that extends between the first chamber and the second chamber such that the flow of fuel is separated from the flow of air by the flow of buffer fluid.

83. The heat exchanger system of any preceding clause, wherein the buffer fluid circulates within the buffer fluid flowpath disposed between the first chamber and the second chamber to transfer heat from the air to the fuel.

84. The heat exchanger system of any preceding clause, wherein the buffer fluid flowpath comprises a first segment surrounding the first chamber and a second segment surrounding the second chamber, and wherein the buffer fluid circulates in a first direction in the first segment and in a second direction in the second segment, the first direction different from the second direction to establish a counter-flow or cross-flow of the buffer fluid.

85. The heat exchanger system of any preceding clause, further comprising a buffer fluid recuperator and a buffer fluid heat exchanger, wherein the buffer fluid flowpath passes through both the buffer fluid recuperator and the buffer fluid heat exchanger.

86. The heat exchanger system of any preceding clause, wherein a recirculation pump pumps the buffer fluid to establish circulation of the buffer fluid through the buffer fluid flowpath.

87. The heat exchanger system of any preceding clause, wherein circulation of the buffer fluid through the buffer fluid flowpath is established by natural convection.

88. The heat exchanger system of any preceding clause, further comprising an outer wall surrounding each of the first chamber, the second chamber, and the buffer fluid flowpath, wherein the first chamber comprises a first wall, the second chamber comprises a second wall, and the buffer fluid flowpath comprises a third wall, and wherein the fuel is separated from the bleed air by the first wall, the second wall, and the third wall.

89. The heat exchanger system of any preceding clause, wherein the buffer fluid flowpath comprises a first segment surrounding the first chamber and a second segment surrounding the second chamber.

90. The heat exchanger system of any preceding clause, wherein the buffer fluid flowpath comprises a cross-flow tube and wherein the cross-flow tube extends from the first segment to the second segment.

91. The heat exchanger system of any preceding clause, wherein the cross-flow tube is oriented perpendicular to the first chamber and the second chamber and wherein a flow of the buffer fluid in the cross-tube is perpendicular to both the flow of fuel and flow of bleed air.

92. The heat exchanger system of any preceding clause, wherein the cross-flow tube includes at least one of internal fins, internal flow rate-metering, turbulating or mixing features, and boundary layer restarting features.

93. The heat exchanger system of any preceding clause, wherein the buffer fluid flowpath comprises four cross-flow tubes.

94. The heat exchanger system of any preceding clause, wherein the cross-flow tubes are a coated tube array and wherein the coating is selected based on the buffer fluid.

95. The heat exchanger system of any preceding clause, wherein the cross-flow tubes are an uncoated tube array.

96. The heat exchanger system of any preceding clause, wherein the cross-flow tubes vary in diameter or width.

97. The heat exchanger system of any preceding clause, wherein the cross-flow tubes decrease in diameter from the cross-flow tube nearest the first inlet and the second inlet to the cross-flow tube nearest the first outlet and the second outlet.

98. The heat exchanger system of any preceding clause, wherein at least two cross-flow tubes have the same diameter or width.

99. The heat exchanger system of any preceding clause, wherein the diameter or width of at least one cross-flow tube varies along a length of the cross-flow tube.

100. The heat exchanger system of any preceding clause, wherein the diameter or width of the at least one cross-flow tube continuously tapers from one end to an opposite end.

101. The heat exchanger system of any preceding clause, wherein the at least one cross-flow tube includes step changes in its diameter or width along a length of the at least one cross-flow tube.

102. The heat exchanger system of any preceding clause, wherein at least one cross-flow tube includes an external baffle array with a variable flow area within at least one of the first chamber and the second chamber.

103. The heat exchanger system of any preceding clause, wherein the variable flow area is disposed in the first chamber and is contracting along a direction of the flow of the cool fluid.

104. The heat exchanger system of any preceding clause, wherein the variable flow area is disposed in the first chamber and is expanding along a direction of the flow of the cool fluid.

105. The heat exchanger system of any preceding clause, wherein the variable flow area is disposed in the second chamber and is contracting along a direction of the flow of the hot fluid.

106. The heat exchanger system of any preceding clause, wherein the variable flow area is disposed in the second chamber and is expanding along a direction of the flow of the hot fluid.

107. The heat exchanger system of any preceding clause, wherein at least one cross-flow tube includes at least one of an external fin array, a graded geometry, a uniform geometry, a tapered geometry, and a variable pitch geometry.

108. The heat exchanger system of any preceding clause, wherein the buffer fluid flowpath comprises a first segment surrounding the first chamber and a second segment surrounding the second chamber, the first segment in thermal communication with the second segment along a length.

109. The heat exchanger system of any preceding clause, wherein the first segment is disposed adjacent the second segment to define a heat exchanger assembly having an outer surface.

110. The heat exchanger system of any preceding clause, wherein a thermal insulation surrounds the outer surface.

111. The heat exchanger system of any preceding clause, wherein the thermal insulation is applied around an intake side of the cool fluid near the first inlet.

112. The heat exchanger system of any preceding clause, wherein the thermal insulation is applied around an intake side of the hot fluid near the second inlet.

113. The heat exchanger system of any preceding clause, wherein the thermal insulation is a vacuum insulation with a vapor-cooled heat shield, a vacuum insulation with a multi-layer insulation blanket, double-aluminized dimpled Mylar®, double-aluminized Mylar® with a fabric spacer, double-aluminized dimpled biaxially-oriented polyethylene terephthalate, double-aluminized biaxially-oriented polyethylene terephthalate with a fabric spacer, double-goldized dimpled Mylar®, double-goldized Mylar® with a fabric spacer, double-goldized dimpled biaxially-oriented polyethylene terephthalate, double-goldized biaxially-oriented polyethylene terephthalate with a fabric spacer, a vacuum-panel insulation, a foam with a vapor barrier, an evacuated powder, diatomaceous earth, a silica aerogel, silica, silica encapsulated in a metal lining, silica encapsulated in fiber, silica encapsulated in a cloth blank, glass fiber, glass fiber encapsulated in a metal lining, glass fiber encapsulated in fiber, glass fiber encapsulated in a cloth blank, a micropore ceramic system, a micropore ceramic system encapsulated in a metal lining, a micropore ceramic system encapsulated in fiber, a micropore ceramic system encapsulated in a cloth blank, or a fiber blanket.

114. The heat exchanger system of any preceding clause, wherein an outer wall defines the outer surface and wherein the first chamber, the second chamber, and the buffer fluid flowpath are each disposed within a volume defined by the outer wall.

115. The heat exchanger system of any preceding clause, wherein the first chamber comprises a plurality of fuel tubes, and wherein the buffer fluid flowpath surrounds each fuel tube of the plurality of fuel tubes.

116. The heat exchanger system of any preceding clause, wherein the buffer fluid flowpath defines an outer surface, and wherein the second chamber surrounds the buffer fluid flowpath such that the bleed air flows against the outer surface of the buffer fluid flowpath.

117. The heat exchanger system of any preceding clause, wherein the buffer fluid flowpath comprises a plurality of buffer fluid tubes and each fuel tube of the plurality of fuel tubes is disposed within a respective one of the buffer fluid tubes of the plurality of buffer fluid tubes, and wherein each buffer fluid tube of the plurality of buffer fluid tubes comprises at least two concentric walls and a first plurality of radial segments radially connecting the at least two concentric walls, the first plurality of radial segments circumferentially spaced apart from one another to define a plurality of passages through which the buffer fluid flows.

118. The heat exchanger system of any preceding clause, further comprising a second plurality of radial segments radially connecting an inner wall of the at least two concentric walls to a respective one fuel tube of the plurality of fuel tubes, the second plurality of radial segments circumferentially spaced apart from one another.

119. The heat exchanger system of any preceding clause, wherein the buffer fluid flowpath comprises a plurality of buffer fluid tubes and each fuel tube of the plurality of fuel tubes is disposed within a respective one of the buffer fluid tubes of the plurality of buffer fluid tubes, wherein each buffer fluid tube of the plurality of buffer fluid tubes comprises a plurality of arcuate segments defining the buffer fluid flowpath, and wherein the plurality of arcuate segments are offset from one another to define a plurality of passages through which the buffer fluid flows.

120. The heat exchanger system of any preceding clause, further comprising a vane array positioned in a fuel inlet header volume of the first chamber.

121. The heat exchanger system of any preceding clause, wherein the fuel inlet header volume is disposed adjacent the first inlet of the first chamber.

122. The heat exchanger system of any preceding clause, further comprising a vane array positioned in an air inlet flow diffuser volume of the second chamber.

123. The heat exchanger system of any preceding clause, wherein the air inlet flow diffuser volume is disposed adjacent the second inlet of the second chamber.

124. The heat exchanger system of any preceding clause, wherein the first chamber comprises internal fins to aid in the exchange of heat between the fuel and the buffer fluid.

125. The heat exchanger system of any preceding clause, wherein the first chamber comprises a first wall, the second chamber comprises a second wall, and the buffer fluid flowpath comprises a third wall, and wherein the internal fins project from the third wall into the first chamber.

126. The heat exchanger system of any preceding clause, wherein the second chamber comprises internal fins to aid in the exchange of heat between the bleed air and the buffer fluid.

127. The heat exchanger system of any preceding clause, wherein the first chamber comprises a first wall, the second chamber comprises a second wall, and the buffer fluid flowpath comprises a third wall, and wherein the internal fins project from the third wall into the second chamber.

128. A hypersonic vehicle comprising a hypersonic propulsion engine comprising a combustion section and a ducting assembly comprising an outer case; a fuel delivery system for providing a flow of fuel to the combustion section of the hypersonic propulsion engine, the fuel delivery system comprising a fuel tank; and a heat exchanger disposed outside the outer case and in flow communication with the fuel tank and bleed air from the hypersonic propulsion engine, the heat exchanger comprising: a first chamber for receipt of the flow of fuel, the first chamber defining a first inlet for an ingress of the fuel into the first chamber and a first outlet for an egress of the fuel from the first chamber; a second chamber for receipt of a flow of the bleed air, the second chamber defining a second inlet for an ingress of the bleed air into the second chamber and a second outlet for an egress of the bleed air from the second chamber; and a buffer fluid flowpath for circulation of a buffer fluid therethrough, the buffer fluid flowpath comprising a buffer fluid inlet for an ingress of the buffer fluid and a buffer fluid outlet for an egress of the buffer fluid, the buffer fluid flowpath disposed between the first chamber and the second chamber, wherein the buffer fluid circulates within the buffer fluid flowpath disposed between the first chamber and the second chamber to transfer heat from the bleed air to the fuel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A heat exchanger, comprising:
   an outer wall;
   a first chamber encased within the outer wall, the first chamber at least partially defined by a first wall disposed within the outer wall, the first wall defining a first outer surface, wherein the first chamber includes a first inlet and a first outlet;
   a second chamber encased within the outer wall, the second chamber at least partially defined by a second wall disposed within the outer wall, the second wall defining a second outer surface, wherein the second chamber includes a second inlet and a second outlet;
   a third wall encased within the outer wall, the third wall having a first side and a second side, wherein the third wall separates the first wall of the first chamber from the second wall of the second chamber;
   a first buffer fluid flowpath defined within the outer wall between the outer surface of the first wall and the first side of the third wall, wherein the first buffer fluid flowpath includes a buffer fluid outlet;
   a second buffer fluid flowpath defined within the outer wall between the outer surface of the second wall and the second side of the third wall, wherein the third wall fluidly isolates the first buffer fluid flowpath from the second buffer fluid flowpath, and wherein the second buffer fluid flowpath includes a buffer fluid inlet;
   a plurality of cross-flow tubes disposed within the outer wall and extending through the first chamber, the third wall and the second chamber, wherein the plurality of cross-flow tubes fluidly couple the first buffer fluid flowpath to the second buffer fluid flowpath; and
   a pump fluidly coupled to the buffer fluid inlet and the buffer fluid outlet.

2. The heat exchanger of claim 1, wherein the pump is a recirculation pump, wherein the recirculation pump pumps a buffer fluid into the buffer fluid inlet, through the second buffer fluid flowpath around the second chamber, though the plurality of cross-flow tubes, into the first buffer fluid flowpath around the first chamber, and out of the buffer outlet.

3. The heat exchanger of claim 2, wherein the buffer fluid inlet and the buffer fluid outlet are fluidly coupled to a buffer fluid recuperator and a buffer fluid heat exchanger, wherein the buffer fluid passes through both the buffer fluid recuperator and the buffer fluid heat exchanger.

4. The heat exchanger of claim 1, wherein the plurality of cross-flow tubes is oriented perpendicular to a flow of a cool fluid flowing through the first chamber and a flow of a hot fluid flowing through the second chamber.

5. The heat exchanger of claim 1, wherein the pump drives a buffer fluid in a first direction through the first buffer fluid flowpath and in a second direction through the second buffer fluid flow path, the first direction different from the second direction such that a counter-flow of the buffer fluid is established along the first side and the second side of the third wall.

6. The heat exchanger of claim 1, wherein at least one cross-flow tube of the plurality of cross-flow tubes comprises a fin array comprising a plurality of fins disposed within the first chamber or the second chamber.

7. The heat exchanger of claim 1, wherein at least one cross-flow tube of the plurality of cross-flow tubes comprises a fin array comprising a plurality of fins, wherein a first portion of fins of the plurality of fins is disposed within the first chamber, and wherein a second portion of fins of the plurality of fins is disposed within the second chamber.

8. The heat exchanger of claim 1, wherein at least one cross-flow tube of the plurality of cross-flow tubes comprises a fin array comprising a plurality of fins, wherein a first portion of fins of the plurality of fins is disposed within the first chamber, wherein a second portion of fins of the plurality of fins is disposed within the second chamber, and wherein the first portion of fins has more fins than the second portion of fins.

9. The heat exchanger of claim 1, wherein a first cross-flow tube of the plurality of cross-flow tubes has a first diameter and a second cross-flow tube of the plurality of cross-flow tubes has a second diameter, wherein the first diameter is greater than the second diameter.

10. The heat exchanger of claim 9, wherein the first cross-flow tube is disposed upstream from the second cross-flow tube with respect to a flow of a cool fluid flowing through the first chamber and a hot fluid flowing through the second chamber.

11. The heat exchanger of claim 1, wherein the first chamber defines a fuel inlet manifold volume therein, and wherein a vane array is disposed within the fuel inlet manifold volume.

12. The heat exchanger of claim 1, wherein the second chamber defines an air inlet flow diffuser volume therein, and wherein a vane array is disposed within the air inlet flow diffuser volume.

13. The heat exchanger of claim 1, wherein the third wall includes a plurality of fins extending into both the first buffer fluid flow path and into the second buffer fluid flowpath, wherein the plurality of fins transfer thermal energy therebetween.

14. The heat exchanger of claim 1, further comprising a baffle array disposed in at least one of the first chamber and the second chamber.

15. The heat exchanger of claim 14, wherein the baffle array has a variable flow area.

16. A hypersonic aircraft, comprising:
   a hypersonic propulsion engine comprising a hot bleed air source, a combustion section and a ducting assembly comprising an outer case;
   a fuel delivery system for providing a flow of fuel to the combustion section of the hypersonic propulsion engine, the fuel delivery system comprising a fuel tank;
   a heat exchanger disposed outside the outer case and in fluid communication with the fuel tank and with bleed air from the hypersonic propulsion engine, the heat exchanger comprising:
      an outer wall;
      a first chamber defined within the outer wall, the first chamber at least partially defined by a first wall disposed within the outer wall, the first wall defining a first outer surface, wherein the first chamber includes a first inlet fluidly coupled to the fuel delivery system and a first outlet fluidly coupled to the combustion section;
      a second chamber defined within the outer wall, the second chamber at least partially defined by a second wall disposed within the outer wall, the second wall defining a second outer surface, wherein the second chamber includes a second inlet fluidly coupled to the hot bleed air source and a second outlet;

a third wall extending within the outer wall, the third wall having a first side and a second side, wherein the third wall separates the first wall of the first chamber from the second wall of the second chamber;

a pump for providing a buffer fluid;

a first buffer fluid flowpath defined between the outer surface of the first wall and the first side of the third wall, wherein the first buffer fluid flowpath includes a buffer fluid outlet fluidly coupled to the pump;

a second buffer fluid flowpath defined between the outer surface of the second wall and the second side of the third wall, wherein the third wall fluidly isolates the first buffer fluid flowpath from the second buffer fluid flowpath, and wherein the second buffer fluid flowpath includes a buffer fluid inlet fluidly coupled to the pump; and a plurality of cross-flow tubes disposed within the outer wall and extending through the first chamber, the third wall and the second chamber, wherein the plurality of cross-flow tubes fluidly couple the first buffer fluid flowpath to the second buffer fluid flowpath.

17. The hypersonic aircraft of claim 16, wherein the pump is a recirculation pump, wherein the recirculation pump pumps the buffer fluid through the second buffer fluid flowpath around the second chamber, though the plurality of cross-flow tubes, into the first buffer fluid flowpath around the first chamber, and out of the buffer outlet.

18. The hypersonic aircraft of claim 16, wherein the buffer fluid inlet and the buffer fluid outlet are fluidly coupled to a buffer fluid recuperator and a buffer fluid heat exchanger, wherein the buffer fluid passes through both the buffer fluid recuperator and the buffer fluid heat exchanger.

19. The hypersonic aircraft of claim 16, wherein the plurality of cross-flow tubes is oriented perpendicular to a flow of fuel form the fuel delivery system flowing through the first chamber and a flow of hot bleed air from the hot bleed air source flowing through the second chamber.

20. The hypersonic aircraft of claim 16, wherein the pump drives the buffer fluid in a first direction through the first buffer fluid flowpath and in a second direction through the second buffer fluid flow path, the first direction different from the second direction such that a counter-flow of the buffer fluid is established along the first side and the second side of the third wall.

* * * * *